US010668829B2

(12) United States Patent
Von Novak, III et al.

(10) Patent No.: US 10,668,829 B2
(45) Date of Patent: Jun. 2, 2020

(54) PASSIVE FLUX BRIDGE FOR CHARGING ELECTRIC VEHICLES

(71) Applicant: WiTricity Corporation, Watertown, MA (US)

(72) Inventors: William Henry Von Novak, III, San Diego, CA (US); Cody Wheeland, San Diego, CA (US); Jonathan Beaver, Auckland (NZ); Xi Gong, Shanghai (CN); Chang-Yu Huang, Auckland (NZ); Martin Thienel, Munich (DE)

(73) Assignee: WiTricity Corporation, Watertown, MA (US)

( * ) Notice: Subject to any disclaimer, the term of this patent is extended or adjusted under 35 U.S.C. 154(b) by 221 days.

(21) Appl. No.: 15/971,577

(22) Filed: May 4, 2018

(65) Prior Publication Data

US 2019/0337393 A1 Nov. 7, 2019

(51) Int. Cl.
| | |
|---|---|
| *B60L 53/39* | (2019.01) |
| *H02J 50/12* | (2016.01) |
| *H02J 50/90* | (2016.01) |
| *H02J 50/60* | (2016.01) |
| *H02J 50/50* | (2016.01) |
| *H01F 38/14* | (2006.01) |
| *B60L 53/12* | (2019.01) |
| *B60S 3/04* | (2006.01) |

(Continued)

(52) U.S. Cl.
CPC .............. *B60L 53/39* (2019.02); *B60L 53/12* (2019.02); *B60S 3/04* (2013.01); *G05D 1/0217* (2013.01); *H01F 38/14* (2013.01); *H02J 7/025* (2013.01); *H02J 50/12* (2016.02); *H02J 50/50* (2016.02); *H02J 50/60* (2016.02); *H02J 50/90* (2016.02); *G05D 2201/0203* (2013.01)

(58) Field of Classification Search
CPC ....... B60L 53/39; B60L 53/12; G05D 1/0217; H02J 50/50; H02J 7/025; H02J 50/60; H02J 50/90; H02J 50/12
See application file for complete search history.

(56) References Cited

U.S. PATENT DOCUMENTS

| | | |
|---|---|---|
| 9,731,614 B1 | 8/2017 | Sarwat et al. |
| 2011/0254503 A1 | 10/2011 | Widmer et al. |

(Continued)

FOREIGN PATENT DOCUMENTS

| | | |
|---|---|---|
| CN | 206394452 U | 8/2017 |
| KR | 20160108962 A | 9/2016 |

*Primary Examiner* — Alan D Hutchinson
*Assistant Examiner* — Andy Schneider
(74) *Attorney, Agent, or Firm* — Colby Nipper PLLC

(57) ABSTRACT

Systems and methods are described for a passive flux bridge for charging electric vehicles. These systems and methods include a mobile apparatus including mobility components and a material with high magnetic permeability and electrical resistivity. In aspects, the mobility components, e.g., wheels or continuous track, are configured to enable movement of the apparatus and positioning of the apparatus proximate to a vehicle power-transfer apparatus of an electric vehicle. The magnetically permeable and electrically resistive material, e.g., ferrite, is configured to passively channel magnetic flux between a base power-transfer system and the vehicle power-transfer system to wirelessly charge a battery of the electric vehicle.

25 Claims, 16 Drawing Sheets

(51) Int. Cl.
*G05D 1/02* (2020.01)
*H02J 7/02* (2016.01)

(56) References Cited

U.S. PATENT DOCUMENTS

| | | | |
|---|---|---|---|
| 2012/0119575 A1* | 5/2012 | Kurs | B60L 3/003 |
| | | | 307/10.1 |
| 2012/0161696 A1* | 6/2012 | Cook | B60L 11/182 |
| | | | 320/108 |
| 2012/0262002 A1* | 10/2012 | Widmer | B60L 53/65 |
| | | | 307/104 |
| 2014/0333256 A1 | 11/2014 | Widmer et al. | |
| 2016/0068069 A1 | 3/2016 | Percebon et al. | |
| 2017/0018963 A1* | 1/2017 | Takatsu | H02J 50/12 |
| 2018/0178666 A1* | 6/2018 | Javaid | H02J 7/025 |
| 2018/0290550 A1* | 10/2018 | Yang | H02J 50/10 |
| 2019/0023139 A1* | 1/2019 | Wechsler | H02J 7/025 |
| 2019/0097471 A1* | 3/2019 | Pantic | H02J 50/90 |

* cited by examiner

PASSIVE FLUX BRIDGE FOR CHARGING ELECTRIC VEHICLES

FIELD

The present disclosure relates generally to wireless power transfer, and more specifically to wireless electric vehicle charging (WEVC) systems.

BACKGROUND

Wireless power transfer is the transmission of electrical energy from a power source to an electrical load without the use of conductors, such as interconnecting wires. Wireless power is a generic term that refers to a number of different power transmission technologies that use time-varying electric, magnetic, or electromagnetic fields. In wireless power transfer, a wireless transmitter connected to a power source transmits field energy across an intervening space to one or more receivers, where it is converted back to an electric current and then used. Wireless transmission is useful to power electrical devices in cases where interconnecting wires are inconvenient, hazardous, or are not possible. However, current wireless power transfer systems suffer from inefficiencies related to misalignment, high costs, and hazards due to intervening objects.

SUMMARY

Systems and methods are described for a passive flux bridge for charging electric vehicles. In particular, a mobile apparatus includes ferrite to channel and steer magnetic flux between a base power-transfer system and a vehicle power-transfer system of an electric vehicle. This can increase both power transfer and efficiency of power transfer between the base and vehicle power-transfer systems.

In an example aspect, a mobile apparatus for wireless power transfer is disclosed. The mobile apparatus includes mobility components and ferrite. The mobility components are configured to enable movement of the apparatus and positioning of the apparatus proximate to a vehicle power-transfer system of an electric vehicle. The ferrite is configured to passively channel magnetic flux between a base power-transfer system and the vehicle power-transfer system to wirelessly charge a battery of the electric vehicle.

In an example aspect, a method for increasing a power coupling between a vehicle power-transfer system of an electric vehicle and a base power-transfer system is disclosed. The method includes positioning a mobile apparatus directly between a base coil of the base power-transfer system and a vehicle coil of the vehicle power-transfer system, in which the mobile apparatus includes ferrite configured to passively channel magnetic flux between the base power-transfer system and the vehicle power-transfer system to wirelessly charge a battery of the electric vehicle. The method further includes orienting the ferrite to directionally position the ferrite between the vehicle coil and the base coil and steer the magnetic flux from the base power-transfer system toward the vehicle power-transfer system.

In an example aspect, a mobile base power-transfer apparatus is disclosed that includes ferrite and a first coil. The ferrite is configured to channel magnetic flux induced by a magnetic field. The first coil is configured to generate the magnetic field based on an electric current running through the first coil. The first coil is also configured to be removably positioned proximate to a second coil of another base power-transfer apparatus to provide a combined magnetic field that is greater than the magnetic field generated by the first coil. In addition, the electric current running through the first coil is synchronized with a current running through the second coil, and the electric current running through the first coil runs in a first direction that is opposite a second direction of the current running through the second coil.

In an example aspect, a mobile power-transfer apparatus is disclosed. The mobile power-transfer apparatus includes one or more mobility components. The mobility components are configured to enable movement of the apparatus and positioning of the apparatus proximate to a vehicle power-transfer system of an electric vehicle. The mobile power-transfer apparatus also includes a channeling means for passively channeling magnetic flux between a base power-transfer system and the vehicle power-transfer system. The channeling means comprises elements arranged to steer the magnetic flux from the base power-transfer system toward the vehicle power-transfer system when the vehicle power-transfer system is misaligned with the base power-transfer system.

DETAILED DESCRIPTION

Figure 1:
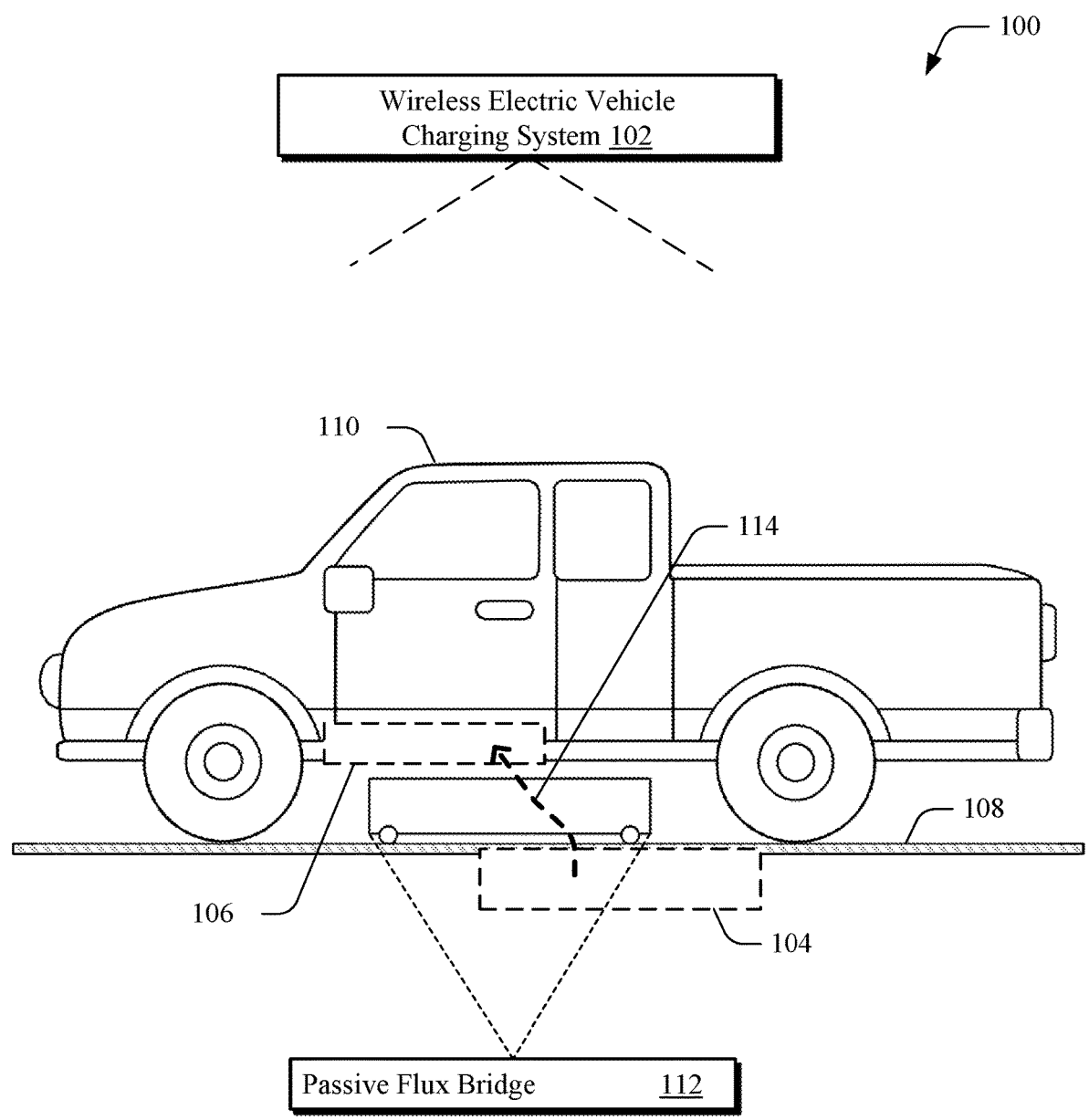
FIG. 1 illustrates an example implementation of a passive flux bridge used with a wireless electric vehicle charging system.

Wirelessly transferring power involves transferring energy through electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiver element" to achieve power transfer.

In a WEVC system, various factors contribute to strengthening or weakening a power coupling between power-transfer systems, such as base and vehicle inductive power transfer systems, referred to herein as a "base pad" and a "vehicle pad", respectively. For example, misalignment between the base pad and the vehicle pad decreases the power coupling, which reduces a level of charging of the electric vehicle. Physical distance between the base pad and the vehicle pad also decreases the power coupling. For example, the power coupling for a high-clearance vehicle may be weaker than for a lower-clearance vehicle due to the greater distance between the base pad and the vehicle pad in the high-clearance vehicle. Another factor that can contribute to affect the power coupling is interoperability between base and vehicle pads. For example, the power coupling is decreased when the base and vehicle pads have differing coil topologies (e.g., circular coil versus a double-D coil). Different coil topologies have different polarizations, which are sensitive to different orientations of the magnetic field and couple differently based on the direction of the magnetic field.

The techniques described in this document include a mobile apparatus configured to act as a passive flux bridge to reorient or direct a magnetic field between base and vehicle power-transfer systems. Misalignment between base and vehicle power-transfer systems can be minimized or prevented, and power coupling improved by positioning a material with high magnetic permeability and electrical resistivity, such as ferrite, between the base and vehicle power-transfer systems. Orienting the ferrite appropriately can redirect the charging magnetic field toward the vehicle power-transfer system to more-efficiently charge the vehicle, when compared to techniques that rely on a user aligning the vehicle power-transfer system with the base power-transfer system. Aspects of the disclosure also increase the level of charging by decreasing or minimizing an air gap between the base power-transfer system and the vehicle power-transfer system by placing the passive flux bridge directly between the base and vehicle power-transfer systems. In addition, the passive flux bridge can increase coupling between base and vehicle power-transfer systems when those systems do not have matching coil topologies. For example, the position and orientation of the passive flux bridge can be selected to particularly redirect the magnetic field from one coil topology to another (e.g., double-D topology to circular topology). In this way, the ferrite is configured to steer the magnetic field effective to change the direction of the magnetic field, based on the position and orientation of the ferrite.

FIG. 1 illustrates an example implementation 100 of a wireless electric vehicle charging system, such as wireless electric vehicle charging (WEVC) system 102. The WEVC system 102 includes a base power-transfer system, such as base pad 104, and a vehicle power-transfer system, such as vehicle pad 106 in a vehicle. The WEVC system 102 transfers energy from a power source (e.g., base pad 104) to a remote system (e.g., vehicle pad 106). The energy is transferred via a magnetic field generated by current running through an inductive coil at the base pad 104 and received by an inductive coil at the vehicle pad 106. In implementations, the base pad 104 is in a fixed location in or on the ground 108. The vehicle pad 106 is fixed to a vehicle, such as vehicle 110. According to movement of the vehicle 110, the vehicle pad 106 can move relative to the base pad 104 and can be stationary when the vehicle 110 is stationary. To charge the vehicle 110, a user may park the vehicle 110 such that the vehicle pad 106 is substantially aligned with the base pad 104. Perfect alignment, however, can be difficult to achieve, even by a self-driving vehicle. Further, optimal power coupling can be difficult to achieve when using the base pad 104 to charge various different vehicles that have differing clearance heights and/or differing coil topologies.

A passive flux bridge, such as passive flux bridge 112, is illustrated as being positioned between the base pad 104 and the vehicle pad 106. The flux bridge 112 is considered "passive" because it may not be connected to either the base pad 104 or the vehicle pad 106. Rather, the flux bridge 112 may be independent of both the base pad 104 and the vehicle pad 106. In aspects, the flux bridge 112 may be passive based on having no power source or other active circuitry. When the vehicle pad 106 is misaligned, the vehicle pad 106 captures less of the magnetic field, resulting in less power usable to charge the vehicle 110. The passive flux bridge 112 is implemented to increase power coupling between the base pad 104 and the vehicle pad 106, effectively increasing a level of charging of the vehicle 110. This is achieved based on the passive flux bridge 112 steering magnetic flux 114 of a magnetic field generated by the base pad 104 toward the vehicle pad 106 of the vehicle 110. The steering (e.g., redirection and reorientation) of the magnetic flux 114 reduces negative effects of the misalignment by causing more of the magnetic field to reach its destination (e.g., the vehicle pad 106).

The flux bridge 112 can be implemented as a mobile apparatus that is separate and remote from the base pad 104 and the vehicle pad 106. The mobile apparatus can move laterally across the ground 108, independently of user interaction, to position itself appropriately between the base pad 104 and the vehicle pad 106. As will be described in more detail below, the flux bridge 112 may have an extendable height to minimize an air gap between the base pad 104 and the vehicle pad 106. The flux bridge 112 includes a magnetically permeable and electrically resistive material that channels the magnetic flux induced by the magnetic field and, based on an orientation of the material, steers the flux 114 to redirect the magnetic field from the base pad 104 toward the vehicle pad 106. In some aspects and as further described below in reference to FIG. 5, the flux bridge 112 may include an additional vehicle pad (not shown) for coupling with the base pad 104, and an additional base pad (not shown) for coupling with the vehicle pad 106. The additional base and vehicle pads in the flux bridge 112 act as repeaters to extend the magnetic flux. Based on the positioning of the base and vehicle pads within the flux bridge 112, the magnetic flux 114 can be extended vertically, horizontally, or both.

Figure 2:
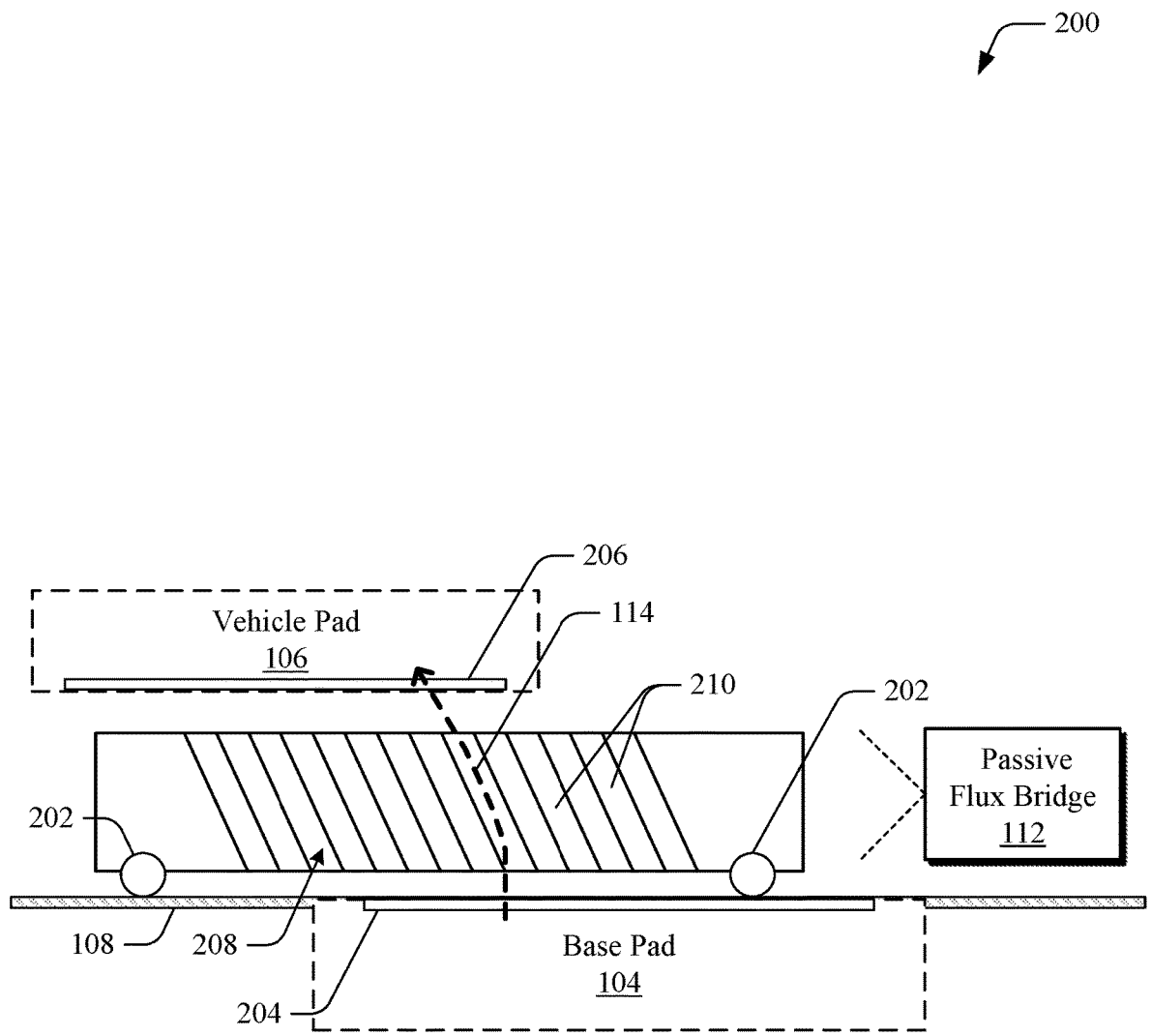
FIG. 2 illustrates an example implementation of a passive flux bridge from FIG. 1 in more detail.

The discussion now turns to FIG. 2, which is an example implementation 200 of a passive flux bridge from FIG. 1 in more detail. The passive flux bridge 112 includes mobility components, such as wheels 202, that enable movement and positioning of the flux bridge 112. Any suitable mobility components can be used, examples of which include a continuous track or a pulley system. The movement can be autonomous, using a controller that controls a motor configured to operate the mobility components. The flux bridge can also include one or more sensors to detect a location of the base pad 104 and a location of the vehicle pad 106. The sensors can also be used to detect the location of the flux bridge 112 relative to the base pad 104 and/or the vehicle pad 106. More specifically, the flux bridge 112 can detect a location of a base coil 204 in the base pad 104 and a location of a vehicle coil 206 in the vehicle pad 106. The location of the vehicle coil 206 or vehicle pad 106 may be a relative to the base coil 204 or base pad 104, or relative to the flux bridge 112. Using these locations, the flux bridge 112 can position itself directly between the base coil 204 and the vehicle coil 206. Alternatively, a user can manually move the mobile apparatus to position and orient the flux bridge 112 between the base coil 204 and the vehicle coil 206, without using the controller or operating the motor.

In addition, the flux bridge 112 may include a material with high magnetic permeability and electrical resistivity, such as ferrite 208, that is usable to channel the flux induced by the magnetic field. The ferrite 208 can include one or more ferrite pieces 210 that are arranged to channel the flux from one end (e.g., bottom) of the flux bridge 112 to another end (e.g., top) of the flux bridge 112. In implementations, the ferrite pieces 210 may be oriented at some acute or obtuse angle from ground 108 such that the ferrite pieces 210 are not perpendicular or parallel to the ground 108, but are oriented at an angle between zero and 90 degrees from the ground 108 or between 90 degrees and 180 degrees from ground. Using a suitable angle (e.g., 20, 25, 30, 35, or 40 degrees) from vertical, the ferrite 208 steers the flux 114 to alter an original direction of the magnetic field from the base pad 104 (e.g., orient the magnetic field away from its natural path) and directs the magnetic field toward the vehicle pad 106. Steering the flux in this way reduces the amount of stray portions of the magnetic field and focuses more flux 114 of the magnetic field toward the vehicle coil 206 of the vehicle pad 106, in comparison to conventional techniques that use only a base pad and a vehicle pad with no intermediary assistance. This focusing can increase both power transfer and efficiency of power transfer.

Figure 3:
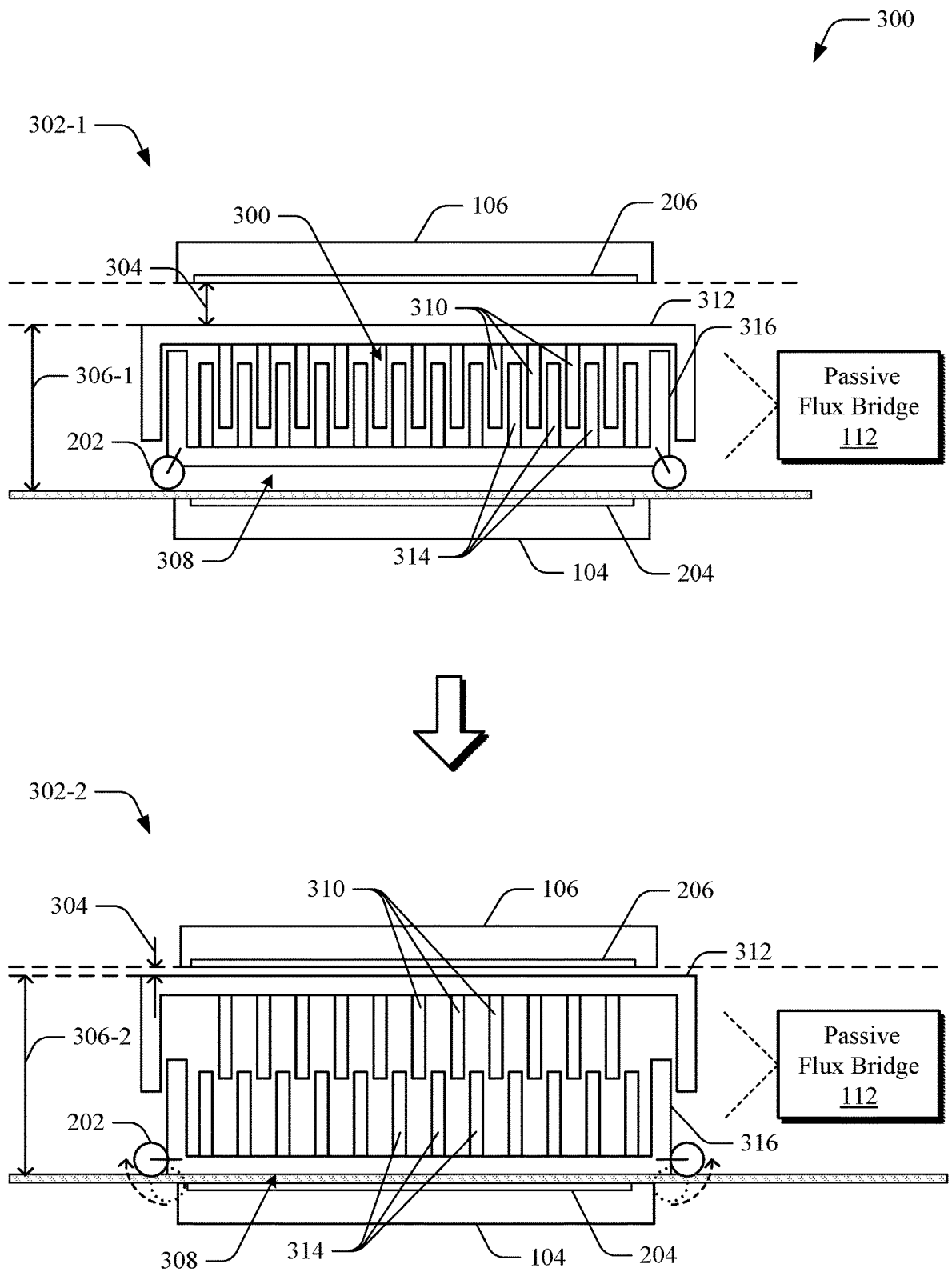
FIG. 3 illustrates an example implementation of a passive flux bridge with extendable height.

FIG. 3 illustrates an example implementation 300 of a passive flux bridge with an extendable height. In FIG. 3, two example scenarios, e.g., scenario 302-1 and scenario 302-2, are illustrated. In scenario 300-1, the flux bridge 112 is positioned between the vehicle coil 206 of the vehicle pad 106 and the base coil 204 of the base pad 104. An air gap 304 exists between the vehicle coil 206 and a top surface of the flux bridge 112, based on a clearance height of the vehicle relative to a height 306-1 of the flux bridge 112. Another air gap 308 exists between the base coil 204 and a bottom surface of the flux bridge 112 based on a clearance height of the flux bridge 112 itself. Generally, gaseous fluids (e.g., air) have an extremely high magnetic reluctance as compared to ferrite. Consequently, reluctance of a flux path through each of the gaps 304, 308 is higher than the reluctance of the flux path through the ferrite 208. Because of this, a flux power coupling between the base coil 204 and the flux bridge 112 over the gap 308, and between the flux bridge 112 and the vehicle coil 206 over the gap 304, is weaker as the gaps 304, 308 increase in size. Consequently, reducing the size of these air gaps can increase the safe level of charging of the electric vehicle.

Accordingly, the flux bridge 112 includes an arrangement of ferrite 208 that is extendable in at least one dimension, e.g., an extension in length. For example, the ferrite 208 in scenario 302-1 is arranged in an alternating pattern with a first set of ferrite pieces 310 coupled to a top portion 312 of the flux bridge 112 and a second set of ferrite pieces 314 coupled to a bottom portion 316 of the flux bridge 112. The first set of ferrite pieces 310 interlock with the second set of ferrite pieces 314. In the scenario 302-1, the first set of ferrite pieces 310 overlap the second set of ferrite pieces 314 by a substantial amount, such as an amount greater than half of a length of a ferrite piece.

In scenario 300-2, the flux bridge has been adjusted to an extended height 306-2. For example, the top portion 312 of the flux bridge 112 can be raised up to reduce the size of the air gap 304 between the vehicle coil 206 and the top surface of the flux bridge 112. As the top portion 312 rises, the amount of overlap between the first set of ferrite pieces 310 and the second set of ferrite pieces 314 decreases, which also extends an effective length of the ferrite 208. The flux can continue to pass from the second set of ferrite pieces 314 to the first set of ferrite pieces 310 based on the proximity of the first set to the second set. The flux bridge 112 is designed to minimize the air gap between the first set of ferrite pieces 310 and the second set of ferrite pieces 314 to minimize reluctance.

In addition, the wheels 202 can be rotatably connected to the bottom portion 316 of the flux bridge 112, such that the position of the wheels 202 can move relative to the bottom portion 316 of the flux bridge 112, outwardly or inwardly. As the wheels 202 move, the air gap 308 between the base coil 204 and the bottom surface of the flux bridge 112 is reduced. Alternatively, the wheels 202 can retract into a cavity of a housing of the flux bridge 112.

One or both of these height adjustments (e.g., raised height, lowered base) can be performed by the flux bridge 112 autonomously, via a remote control (user-operated or machine-operated). Alternatively, one or both of the height adjustments can be performed with user intervention.

Figure 4:
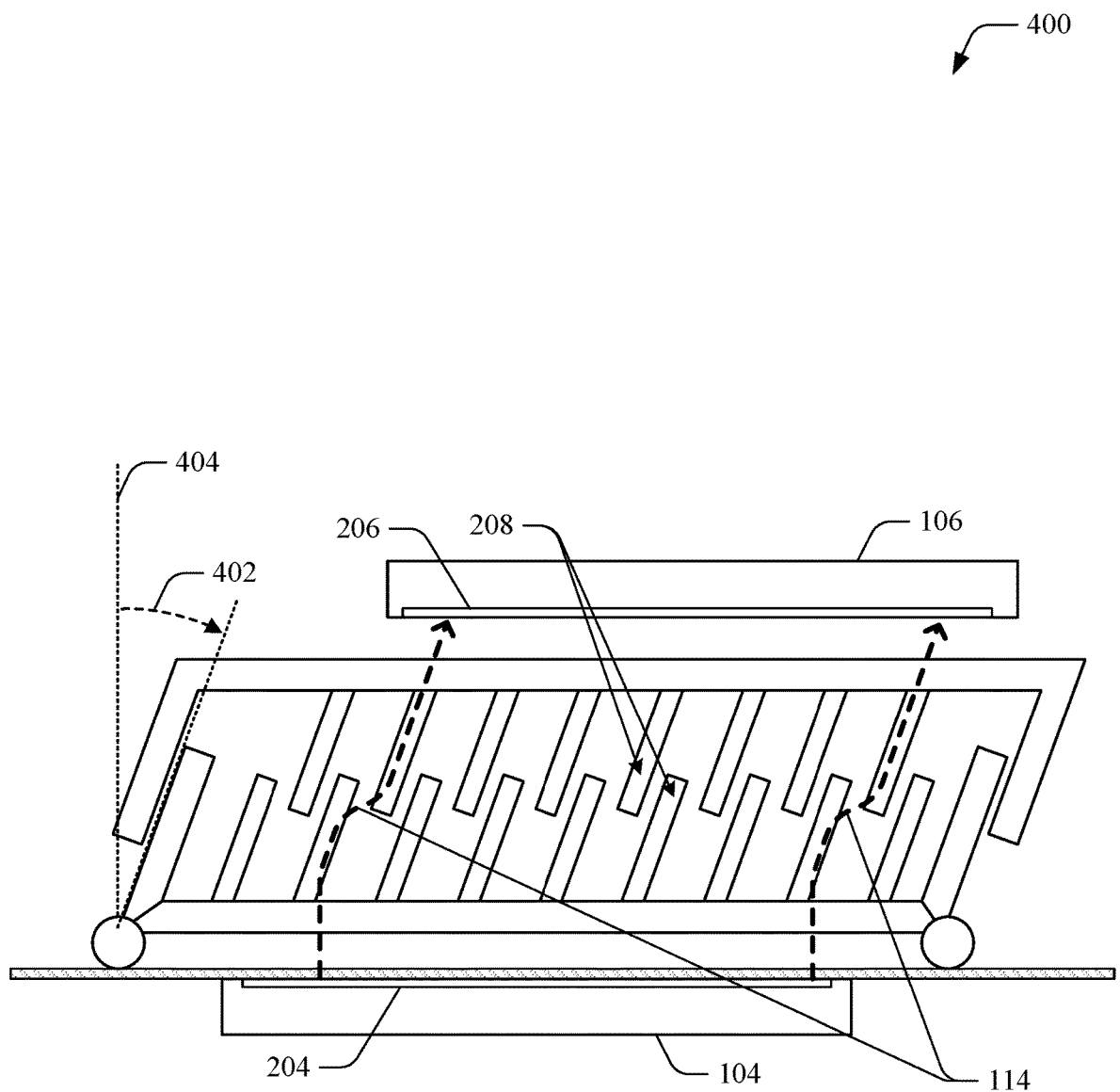
FIG. 4 illustrates example implementation of a passive flux bridge redirecting magnetic flux.

FIG. 4 illustrates another example implementation 400 of a passive flux bridge that steers magnetic flux and redirects a magnetic field. The example implementation 400 illustrates a configuration of the flux bridge 112 from FIG. 1 in which the ferrite 208 is oriented at an acute angle 402 from a vertical axis 404 (e.g., axis normal to ground), such that the ferrite is positioned non-orthogonally to the base coil 204 or the vehicle coil 206. Any suitable angle 402 can be used (e.g., 15, 20, 25, 30, or 35 degrees). The angle 402 may be fixed or may be adjustable.

Because the ferrite 208 channels magnetic flux 114 from one end to an opposing end, the ferrite 208 can steer the magnetic field based on the orientation of the ferrite 208. In the example implementation 400, the ferrite 208 is elongated and rotatably offset from vertical by the angle 402. When the magnetic field generated by the base coil 204 couples with the ferrite 208 in the flux bridge 112, magnetic flux 114 travels lengthwise along the ferrite 208 and exits the flux bridge 112 through the top surface based on the orientation of the ferrite 208. In one example, the ferrite has an elongated structure and is positioned to have a longitudinal axis of the ferrite directed between the base coil 204 and the vehicle coil 206, which may allow magnetic flux to travel lengthwise along the ferrite directly to the vehicle coil 206 from the base coil 204. In other examples, however, the ferrite includes other shapes, such as spherical, cubed, discoid, and so on. Accordingly, the ferrite can have any suitable shape to increase coupling between the vehicle coil 206 and the base coil 204.

Using these techniques, the flux bridge 112 can decrease negative effects of misalignment between the vehicle coil 206 and the base coil 204 and increase a power coupling between the vehicle power-transfer system (e.g., vehicle pad 106) and the base power-transfer system (e.g., base pad 104), by steering the magnetic flux 114 from the base coil 204 directly towards the misaligned vehicle coil 206. In at least one implementation, the flux bridge 112 can also extend its height to decrease the size of air gaps between the flux bridge 112 and the vehicle coil 206. Further, the flux bridge 112 can decrease its own clearance height to decrease the size of the air gap between the flux bridge 112 and the base coil 204.

Using appropriate hinges, servos, sensors, and controllers, the flux bridge 112 can adjust the angle 402 depending on the amount of misalignment between the base coil 204 and the vehicle coil 206. Further, the mobility components provide mobility for the flux bridge 112 to position itself, such that the ferrite is oriented in the appropriate direction between the base coil 204 and the vehicle coil 206.

Figure 5:
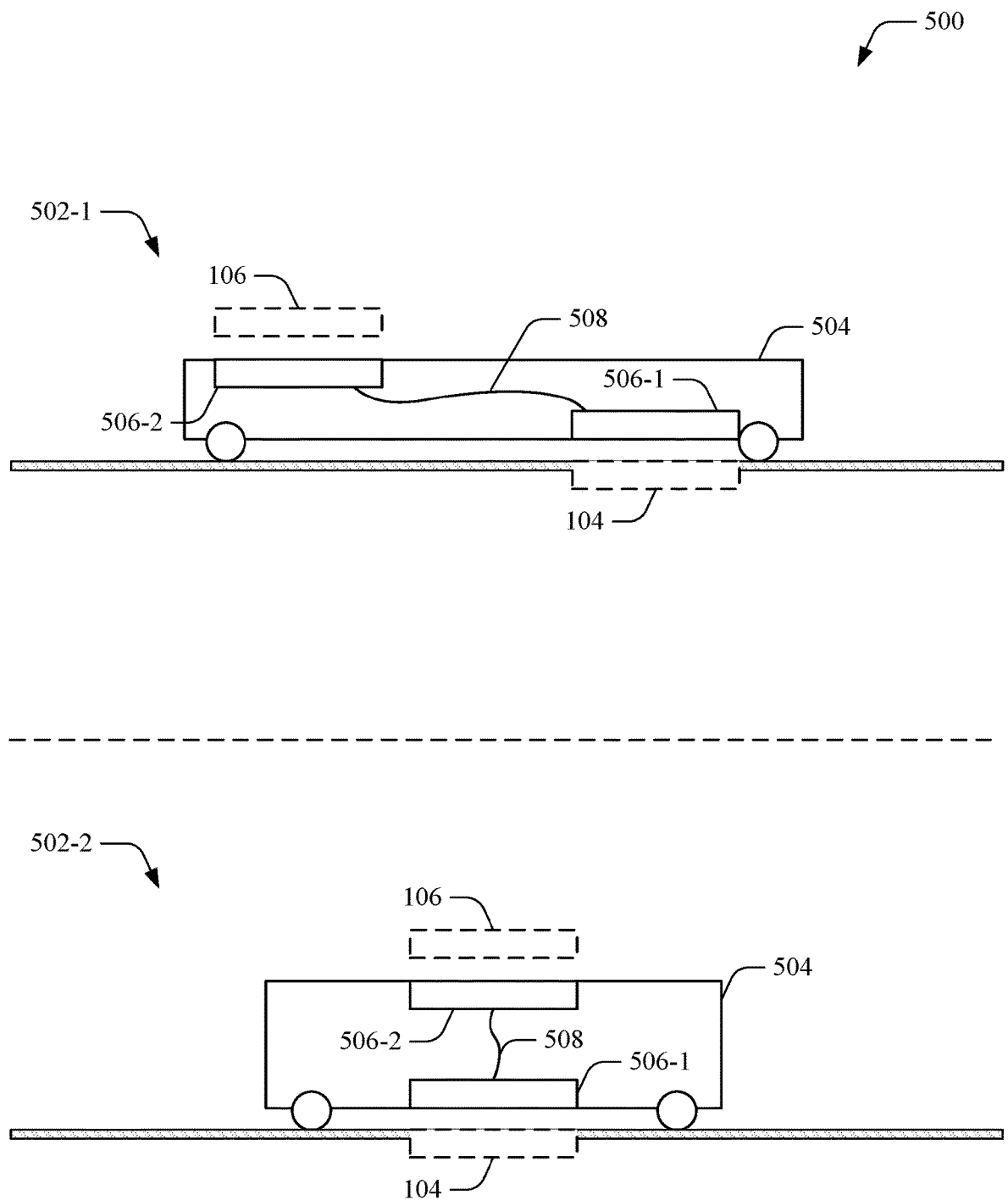
FIG. 5 illustrates an example implementation of a mobile apparatus for providing wireless charging to an electric vehicle.

FIG. 5 illustrates an example implementation 500 of a mobile apparatus for providing wireless charging to an electric vehicle. The example implementation 500 depicts two scenarios 502-1, 502-2, each including an apparatus 504. In aspects, the apparatus 504 is an instance of the passive flux bridge 112 of FIG. 1. In scenario 502-1, an apparatus 504 is equipped with power-transfer repeater system configured to extend power transfer from the base pad 104 to the vehicle pad 106. The power-transfer repeater system may include at least two tuned and connected power-transfer systems, such as repeater pads 506-1, 506-2. An active repeater converts power to direct current (DC) and then back to alternating current (AC) at the other end. For example, the base pad 104 transfers power to the repeater pad 506-1 via a magnetic field, which induces an alternating current in the repeater pad 506-1. The repeater pad 506-1 converts the alternating current to DC power and sends the DC power to the repeater pad 506-2 via a connection, such as wire 508. The repeater pad 506-2 then converts the DC power back to AC to generate a magnetic field and transfer power to the vehicle pad 106. In this way, the apparatus 504 can act as a flux extender to extend the flux horizontally to enable the base pad 104 to charge an electric vehicle positioned in a next parking stall or that is otherwise not aligned with the base pad 104. In aspects, the apparatus 504 may be horizontally extendable such that a distance between the repeater pads 506-1, 506-2 can be adjusted. This allows for adaptability in adjusting to different horizontal distances between the vehicle pad 106 that is misaligned with the base pad 104.

In scenario 502-2, the apparatus 504 includes repeater pads 506-1, 506-2 positioned to enable the apparatus 504 to extend the flux vertically to fill an air gap between the base pad 104 and the vehicle pad 106. As described above, reducing the air gap may increase power coupling, increase efficiency and improve power transfer between the base and vehicle power-transfer systems.

Figure 6:
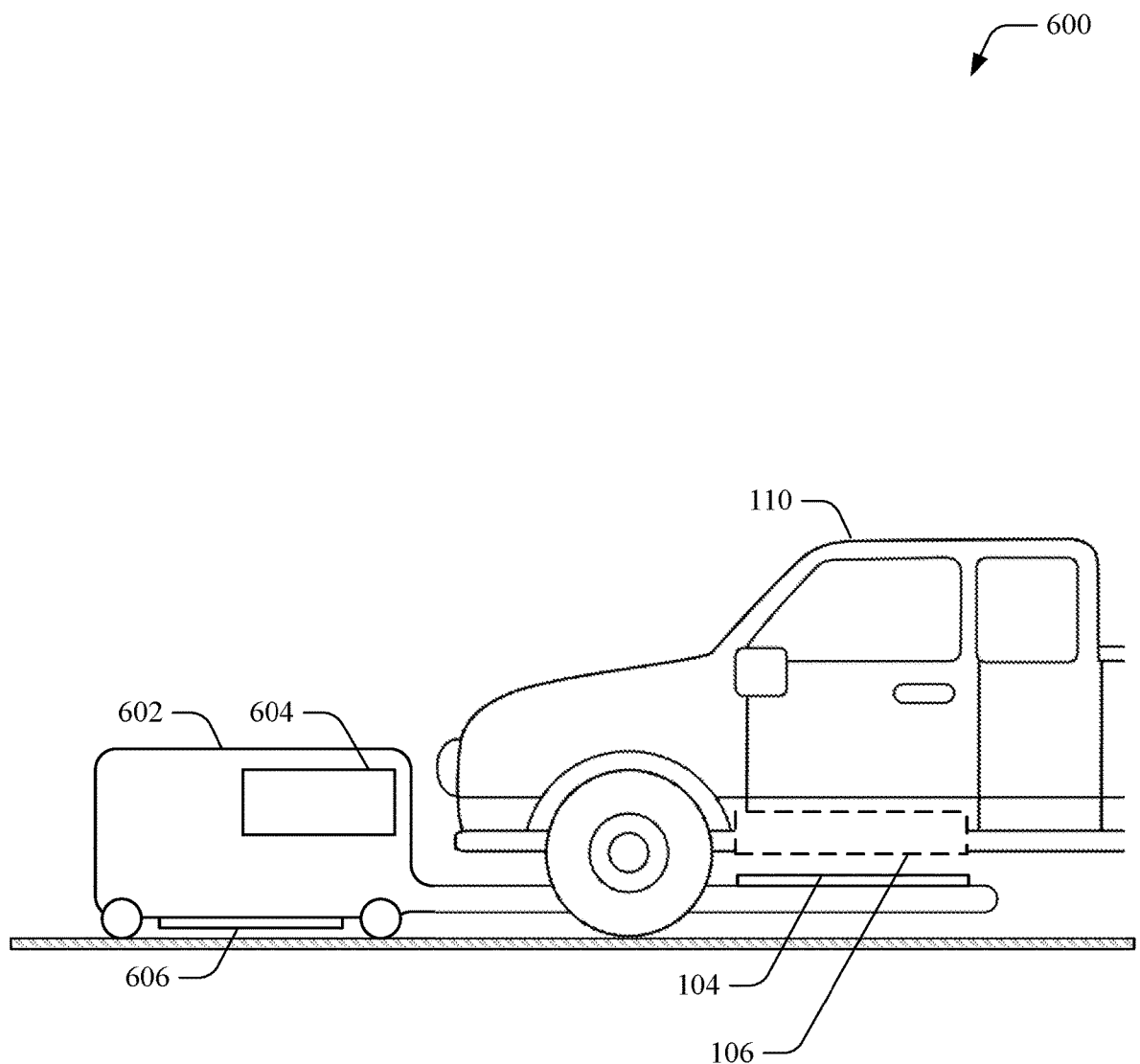
FIG. 6. illustrates an example implementation of a mobile apparatus for charging an electric vehicle.

Consider now FIG. 6, which illustrates an example implementation 600 of a mobile apparatus for charging an electric vehicle. In aspects, a mobile apparatus, such as cart 602 can be partially inserted underneath the electric vehicle 110 to align a base pad 104 disposed on the cart 602 with a vehicle pad 106 of the vehicle 110. The cart 602 may be battery powered, such as by including battery 604, or tethered via a power cable to a power source. In this way, the mobile apparatus can be used to charge the electric vehicle 110 at locations where a stationary base pad that is mounted on, flush with, or buried under ground is not available or accessible. In at least some aspects, the cart 602 may include a receiver pad 606 that, when aligned with a stationary base pad on or in the ground, is usable to charge the battery 604. For example, the receiver pad 606 operates similarly to the vehicle pad 106 to charge the battery 604. This may occur when the cart 602 is not actively charging the vehicle 110.

In aspects, the mobile apparatus (e.g., cart 602) may be sized similarly to the apparatus 504 of FIG. 5 such that the mobile apparatus is capable of being positioned completely underneath the vehicle 110. Further, the mobile apparatus can be used to sequentially charge multiple electric vehicles located in a parking lot. For example, the mobile apparatus can include a controller that receives sensor signals indicating multiple electric vehicles parked in nearby stalls. The mobile apparatus can then automatically move underneath one of the electric vehicles and align itself with the vehicle pad of that electric vehicle to charge a battery of the electric vehicle. After a duration of time or an amount of charge to that vehicle, the mobile apparatus can move to another vehicle to begin charging that other vehicle. In some aspects, the controller can schedule an amount of time to charge the electric vehicle based on a variety of different factors, examples of which include a state of charge of the electric vehicle, an estimated distance that the electric vehicle is to be driven, a priority status of the electric vehicle, a number of passengers scheduled to ride in the electric vehicle, and so on. The controller may be able to schedule a vehicle according to different priorities. For example, a user may be able to pay more (e.g., different charging prices per kWh) for a higher priority and the controller may be able to prioritize which vehicle is charged in and in what order based on an amount of money paid for the charge.

Figure 7A:
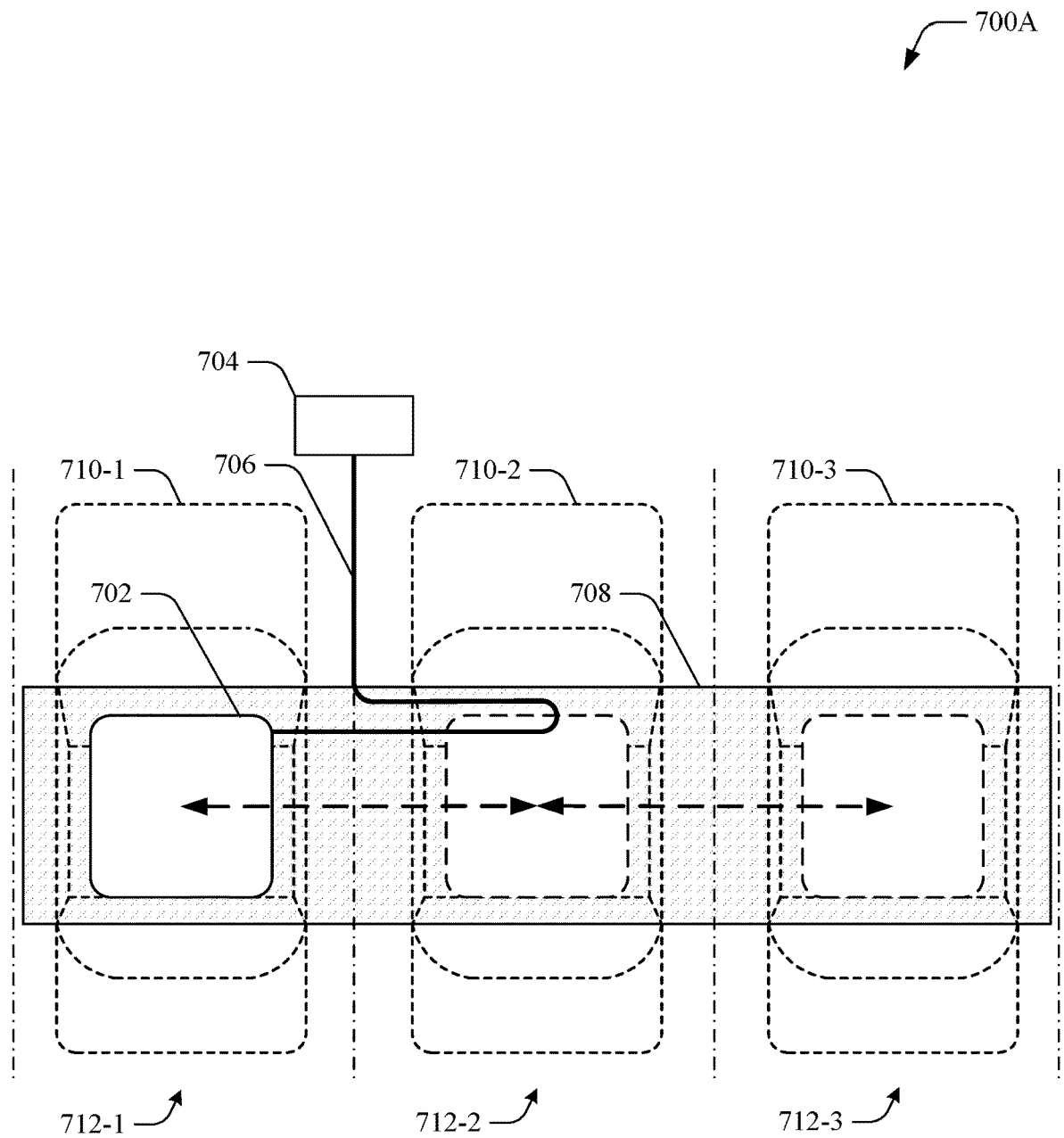
FIG. 7A illustrates an example implementation of a mobile apparatus positioned in a track that enables one-dimensional movement for aligning with a vehicle power-transfer apparatus of an electric vehicle.

FIG. 7A illustrates an example implementation 700A of a mobile apparatus positioned in a track that enables one-dimensional movement for aligning with a vehicle power-transfer system of an electric vehicle. The illustrated example includes a mobile apparatus 702, which may be an instance of the passive flux bridge 112 of FIG. 1. In aspects, the mobile apparatus 702 may be an instance of a base pad, such as the base pad 104, which is mechanically movable. The apparatus 702 is connected to a power source 704 via a cable 706 and disposed within a track 708 that is positioned laterally across multiple parking stalls. Here, the mobile apparatus 702 can be used to share a single charging system across several electric vehicles, such as vehicles 710-1, 710-2, and 710-3, positioned in adjacent parking stalls. To make charging more convenient, the mobile apparatus 702 can operate automatically and without user intervention.

In some aspects, the mobile apparatus 702 can slide or move within the track 708. The track 708 is positioned laterally across parking stalls 712-1, 712-2, 712-3. The track 708 may be placed on, or coupled to, the parking surface. Alternatively, the track 708 may be embedded in the parking surface. The mobile apparatus 702 can be disposed within the track 708 and configured to move along the track 708. If the track 708 is straight, then the mobile apparatus 702 can move along a longitudinal axis of the track 708. In some aspects, the track 708 may be curved to correspond to a particular arrangement of parking stalls. In a curved track, the mobile apparatus 702 can move along the curved direction of the curved track. In addition, the mobile apparatus 702 can move along the track 708 in a variety of different ways. For example, the mobile apparatus 702 can utilize mobility components, such as wheels or a continuous track, e.g., tank tread, to move along a flat surface of the track 708 or rails within the track 708. Alternatively, the mobile apparatus 702 may move based on one or more cables attached to a pulley system that pull the mobile apparatus 702 back and forth along the track 708. Accordingly, the mobile apparatus 702 may move along the track 708 using a variety of different techniques.

In some aspects, a flexible cover can be used to cover the track 708 or an area in which the mobile apparatus 702 may move underneath the electric vehicles 710. The mobile apparatus 702 can include rollers or low-friction material to enable movement underneath the cover and under the vehicles 710. In some implementations, the cover may be used without the track 708. The vehicles 710 may drive over the cover and if a wheel of a stationary vehicle remains stationary on the cover, the mobile apparatus 702 can lift the wheel by moving under the cover and under the wheel. Accordingly, the mobile apparatus can move along the track underneath vehicles parked in the parking stalls to align itself appropriately with a vehicle pad of any one of those vehicles and charge that vehicle.

Figure 7B:
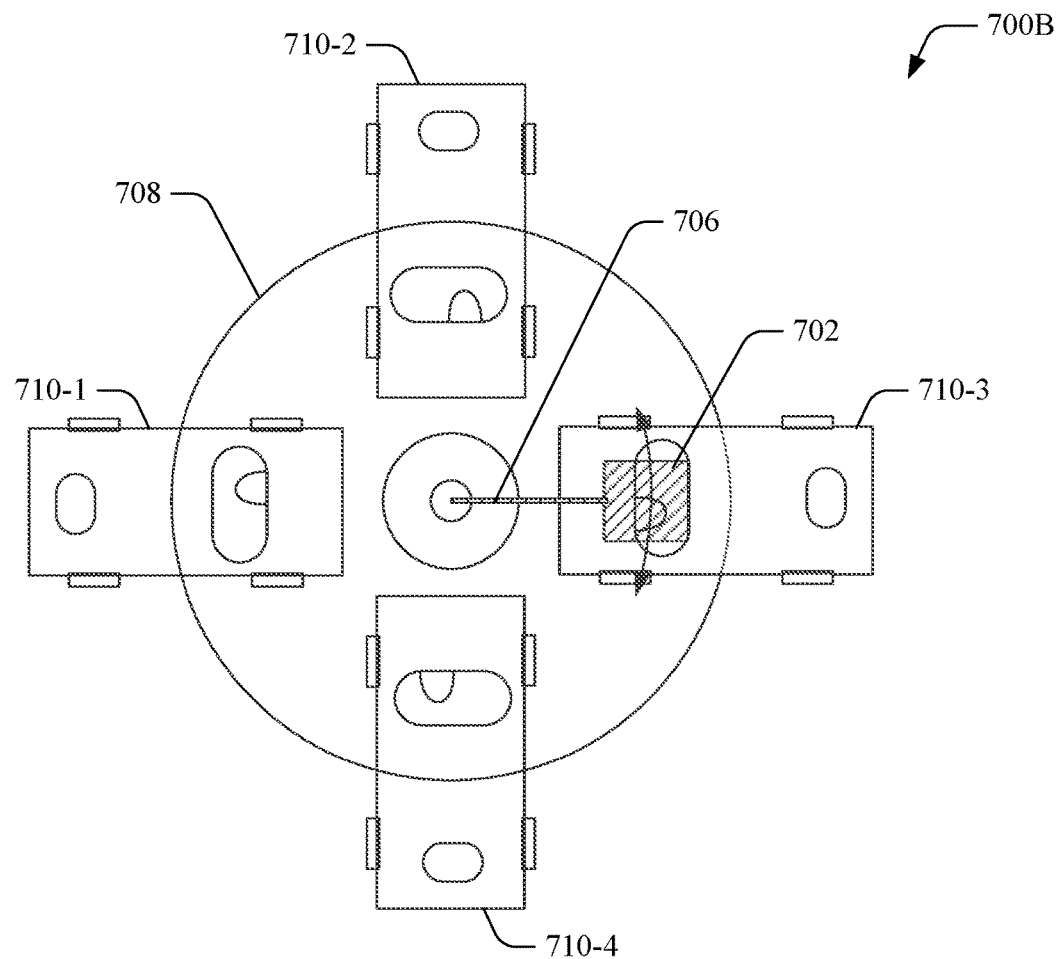
FIG. 7B illustrates a top view and a side view of another example implementation of a mobile apparatus positioned in a track that enables movement for aligning with a vehicle power-transfer apparatus of an electric vehicle.
Figure 7B:
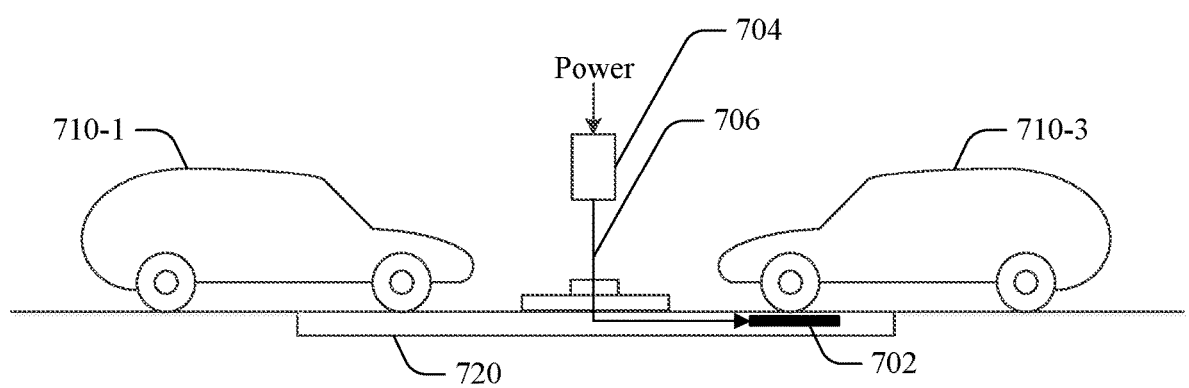

FIG. 7B illustrates a top view and a side view of another example implementation 700B of a mobile apparatus 702 positioned in a track that enables movement for aligning with a vehicle power-transfer apparatus of an electric vehicle. The apparatus 702 is connected to a power source 704 (see side view) via a cable 706. Like in FIG. 7A, the mobile apparatus 702 can be used to share a single charging system across several electric vehicles, such as vehicles 710-1, 710-2, 710-3, and 710-4. The mobile apparatus 702 is configured to rotate around a center (manually or electronically—including automatically and without user intervention) to selectively wirelessly charge one of the vehicles 710-1, 710-2, 710-3, or 710-4 as described herein.

In an aspect, the side view shows a potential implementation that includes a compartment 720 configured to house the mobile apparatus 702. In certain aspects, the mobile apparatus 702 may be configured to additionally move up and down within the compartment to improve coupling based on the technology of the vehicle pad or type of vehicle. For example, the mobile apparatus 702 may be configured to lift into a charging position when a particular vehicle is selected.

Figure 8:
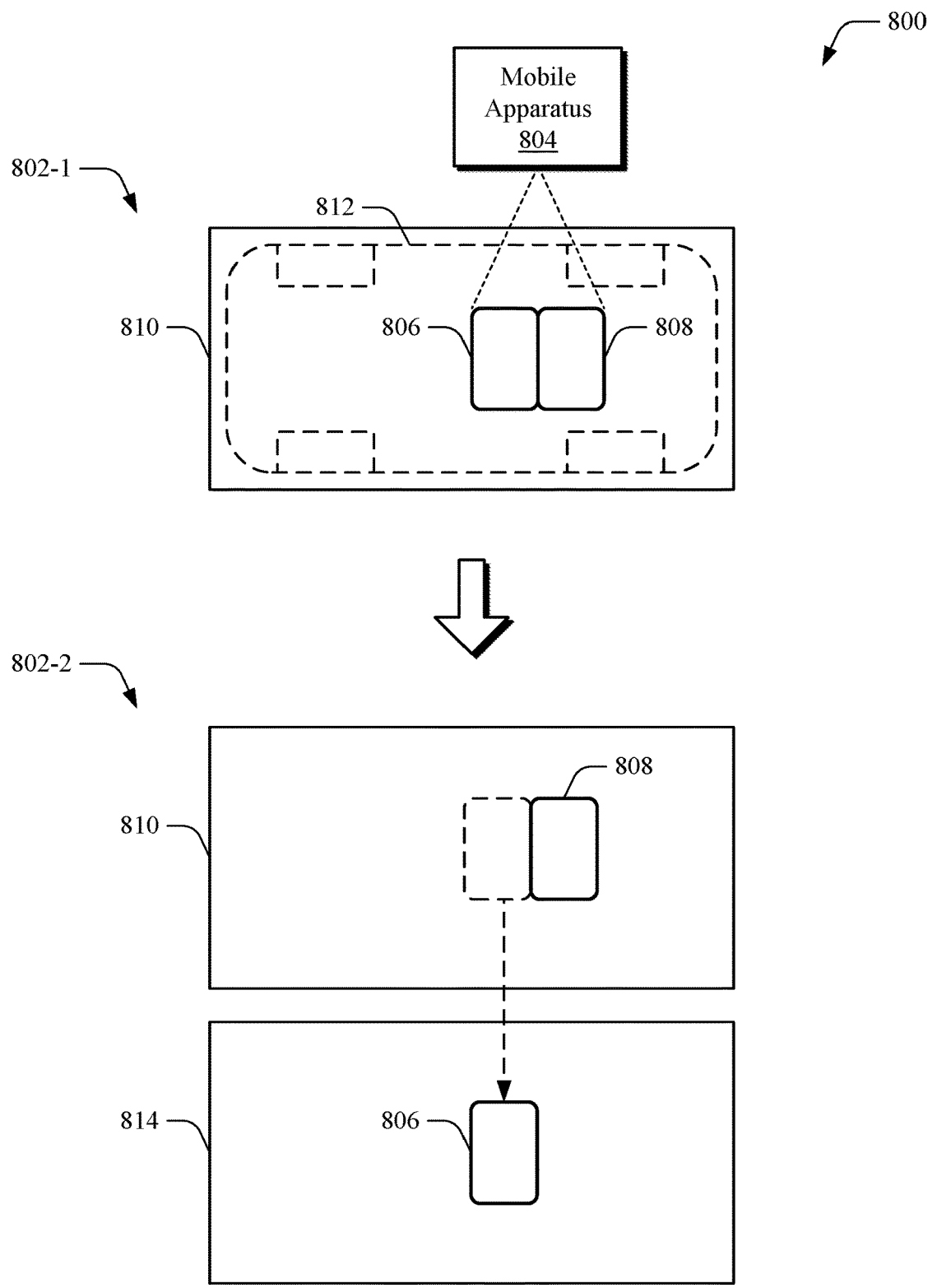
FIG. 8 illustrates an example implementation of a reconfigurable base pad that can be mechanically split.

FIG. 8 illustrates an example implementation 800 of a reconfigurable mobile apparatus that can be mechanically split to charge multiple electric vehicles. The example implementation 800 includes two scenarios 802-1, 802-2 describing different modular formations of a reconfigurable mobile apparatus 804. Scenario 802-1 illustrates a top view of the mobile apparatus 804 having two separate conductors, such as coil 806 and coil 808, wound to form a double-D (DD) coil topology. Here, the coils 806, 808 are positioned within a parking stall 810 to charge a vehicle 812 positioned in the parking stall 810.

In aspects, the coils 806, 808 are modularly connected, such that the coils 806, 808 can be separated from one another to mechanically form two separate circular coils 806 and 808, as shown in scenario 802-2. In the scenario 802-2, the coil 806 has been moved to another location, such as parking stall 814, away from the coil 808 to charge a different vehicle (not shown) located in the parking stall 814. In this case, two WEVC charging stations (each with a circular coil) are created with one DD pad. This may be useful in certain scenarios where a parking lot has an insufficient number of base pads compared to the number of vehicles that need to be charged. Accordingly, when there are more vehicles than base pads, some of the DD coils may mechanically split into multiple coils to increase the number of base pads available to charge the vehicles. Mechanically splitting the DD coils into multiple coils also enables dynamic interoperability between vehicles with different coil topologies. In an example, a first vehicle having a vehicle pad with a circular coil can be charged by splitting the DD coils 806, 808 into two circular coils and using one of the coils 806, 808 to charge that vehicle. Then, when a second vehicle arrives having a vehicle pad with a DD coil, the two coils 806, 808 can come together to form a DD coil and charge the second vehicle.

In aspects, the coils 806 and 808 are driven with current in a direction to create a particular polarization of a magnetic field (e.g., horizontal field in an area above the mobile apparatus 804) when in a DD configuration. For instance, in the DD configuration, current in driven through one coil in a clockwise direction and current is driven in the other coil in a counterclockwise direction, such that the current runs in the same direction in the middle of the DD configuration (e.g., the side of each coil that is proximate the other coil), and magnetic poles are created in the center of each coil (e.g., coil opening or "window"). In this way, a portion of the magnetic field can pass through the pole in the coil window of coil 806 up over the middle of the DD configuration and through the pole in the coil window of coil 808. In aspects, the portion of the magnetic field can pass through the pole in the coil window of coil 808 up over the middle of the DD configuration and through the pole in the coil window of coil 806. The portion of the magnetic field passing over the middle portion of the DD configuration has a large horizontal (e.g., parallel with a plane defined by the coils 806, 808) component compared with a smaller vertical (e.g., normal to the plane defined by the coil) component.

While this example is described using a reconfigurable mobile apparatus with base pads having modular DD coil topologies, these features may also be implemented in a reconfigurable passive flux bridge, such as flux bridge 112 from FIG. 1. For example, the passive flux bridge 112 can include two or more modular portions connected to one another. Each portion may include ferrite to passively channel flux between base and vehicle pads. Based on the number of vehicles requiring charging, the flux bridge 112 may split into multiple flux bridges that can each be positioned under a different vehicle to increase the power coupling between respective base and vehicle pads. With fewer vehicles requiring charging, the flux bridge 112 may maintain two or more of the modular portions together to increase an area of the flux bridge for channeling the flux between the base pad and vehicle pad of a particular vehicle, which may reduce magnetic field emissions and/or enhance the power coupling between the base and vehicle pads.

Figure 9:
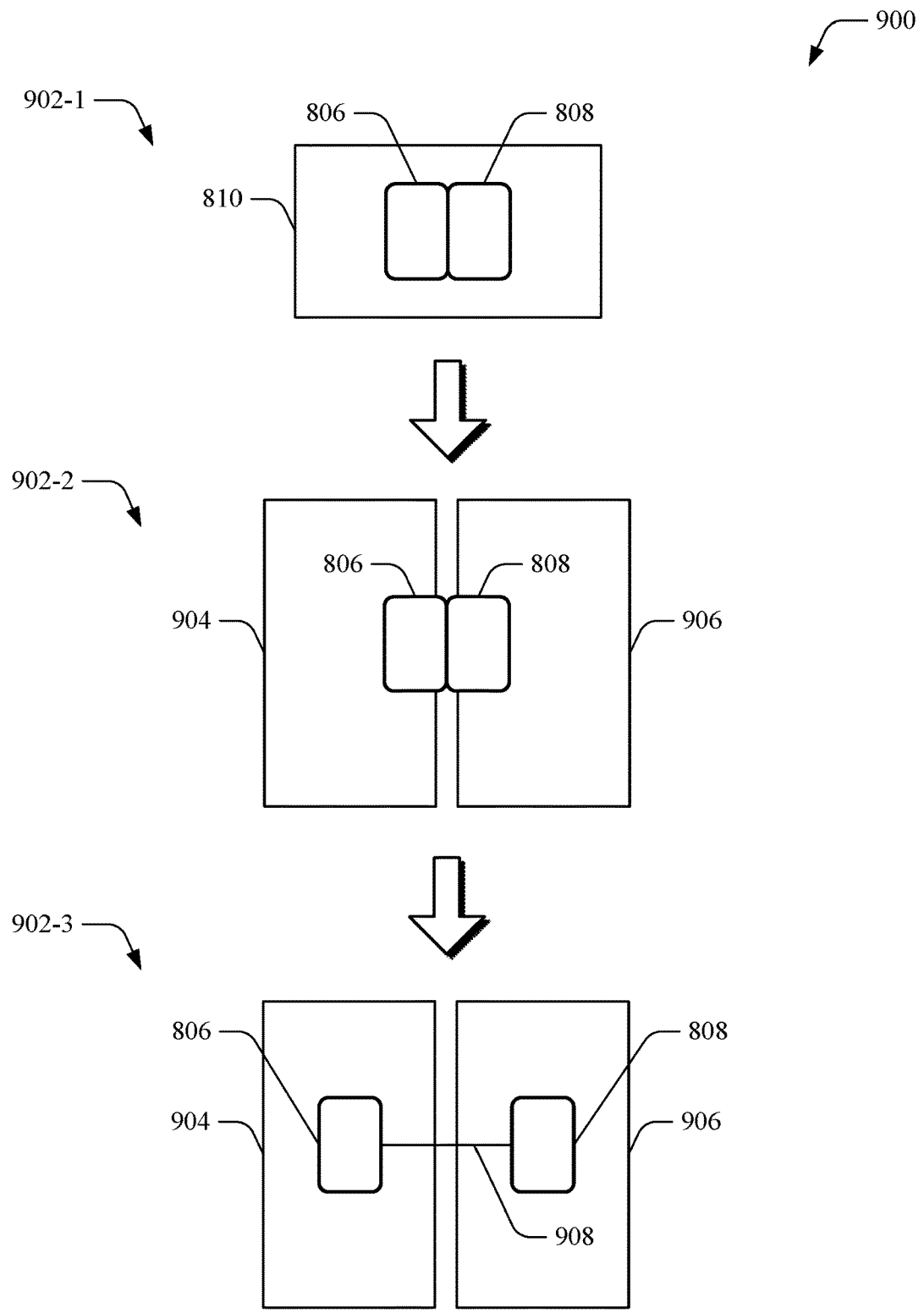
FIG. 9 illustrates an example implementation of a reconfigurable base pad that can be topologically split.

FIG. 9 illustrates an example implementation 900 of a reconfigurable mobile apparatus having a base pad with a DD coil topology that can be topologically split. In scenario 902-1, the coils 806, 808 form a DD coil topology for charging a vehicle parked in the parking stall 810. However, to accommodate an increased number of vehicles needing charging, such as scenario 902-2 in which vehicles may be positioned in parking stalls 904, 906, the coils 806, 808 can operate as separate circular coils 806c, 808c that maintain a physical connection to one another. For example, in scenario 902-3, a distance between the circular coils 806c, 808c can be extended through an extendable wire 908. In this way, two WEVC charging stations (each with a circular coil) can be created with one WEVC charging station having a DD pad.

Figure 10:
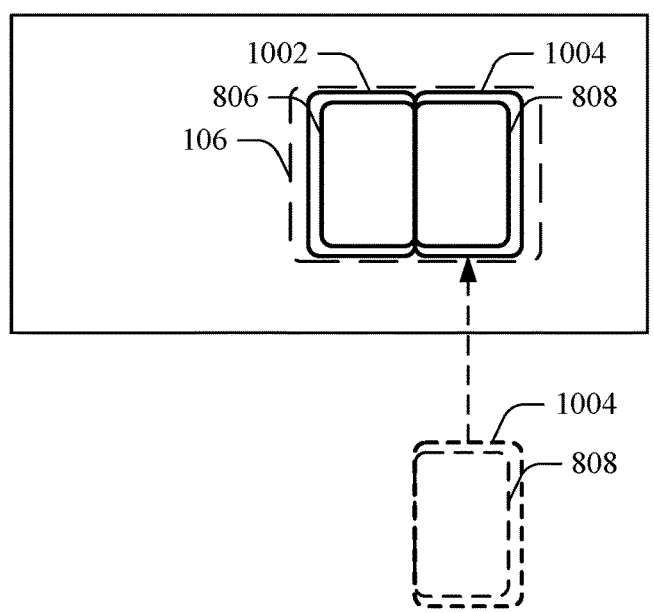
FIG. 10 illustrates an example implementation that combines multiple base pads to charge a same electric vehicle.

FIG. 10 illustrates an example implementation 1000 that combines multiple base pads to charge an electric vehicle. A variety of different configurations exist for base and vehicle pads, each of which may be limited to a maximum level of power transfer based on a variety of factors. Some example factors include amp turns, coil diameter, wire spacing in the coils, and distance between vehicle and base coils. In one example, a base pad 1002 with a circular coil, such as coil 806, may be configured for a maximum power transfer of 7 kW for a vehicle with a ground clearance in a first range of distance, such as 100-150 mm. If the vehicle pad 106 of the vehicle is configured for a higher level of power transfer, such as 10 kW, the maximum power transfer between the base pad 1002 and the vehicle pad 106 may be limited to the 7 kW of the base pad 1002.

In some aspects, however, a second 7 kW base pad 1004 with the coil 808 may be removably positioned side-by-side with the base pad 1002. Then, electric current in both coils 806, 808 can be synchronized to deliver power to the vehicle pad 106. To synchronize the current in both coils 806, 808, the current running through the coil 806 may run clockwise while the current running through the coil 808 runs counterclockwise, or the current in the coil 806 may run counterclockwise while the current in the coil 808 runs clockwise. Accordingly, the current in one coil runs in an opposing direction to that of the other coil so that the current running through the adjacent portions of the two coils runs in the same direction. By combining two synchronized base pads, the amp turns of the two example 7 kW base pads are combined to power a single 10 kW vehicle pad 106. Combining two base pads in this way provides a combined magnetic field that is greater than a magnetic field generated by only one of the base pads. Further, combining two base pads can increase the power coupling between the base pads and the vehicle pad to result in a more efficient power transfer, particularly when the vehicle pad is larger than the base pad or configured for a higher power coupling than the maximum power coupling for which the base pad is configured.

Consider another example in which the vehicle pad 106 is configured for 7 kW power transfer and is mounted on a vehicle with a much higher ground clearance, such as a clearance in the range of 170-250 mm. In this scenario, two base pads 1002, 1004 each configured for 7 kW power transfer at the lower first range of ground clearance can be positioned side-by-side with their electric current synchronized to efficiently deliver power to the vehicle pad 106. Accordingly, a plurality of base pads having a synchronized current can be positioned proximate to one another to transfer power to a vehicle pad at a distance that is greater than a predefined distance for which the base pads are individually configured for power transfer.

Figure 11:
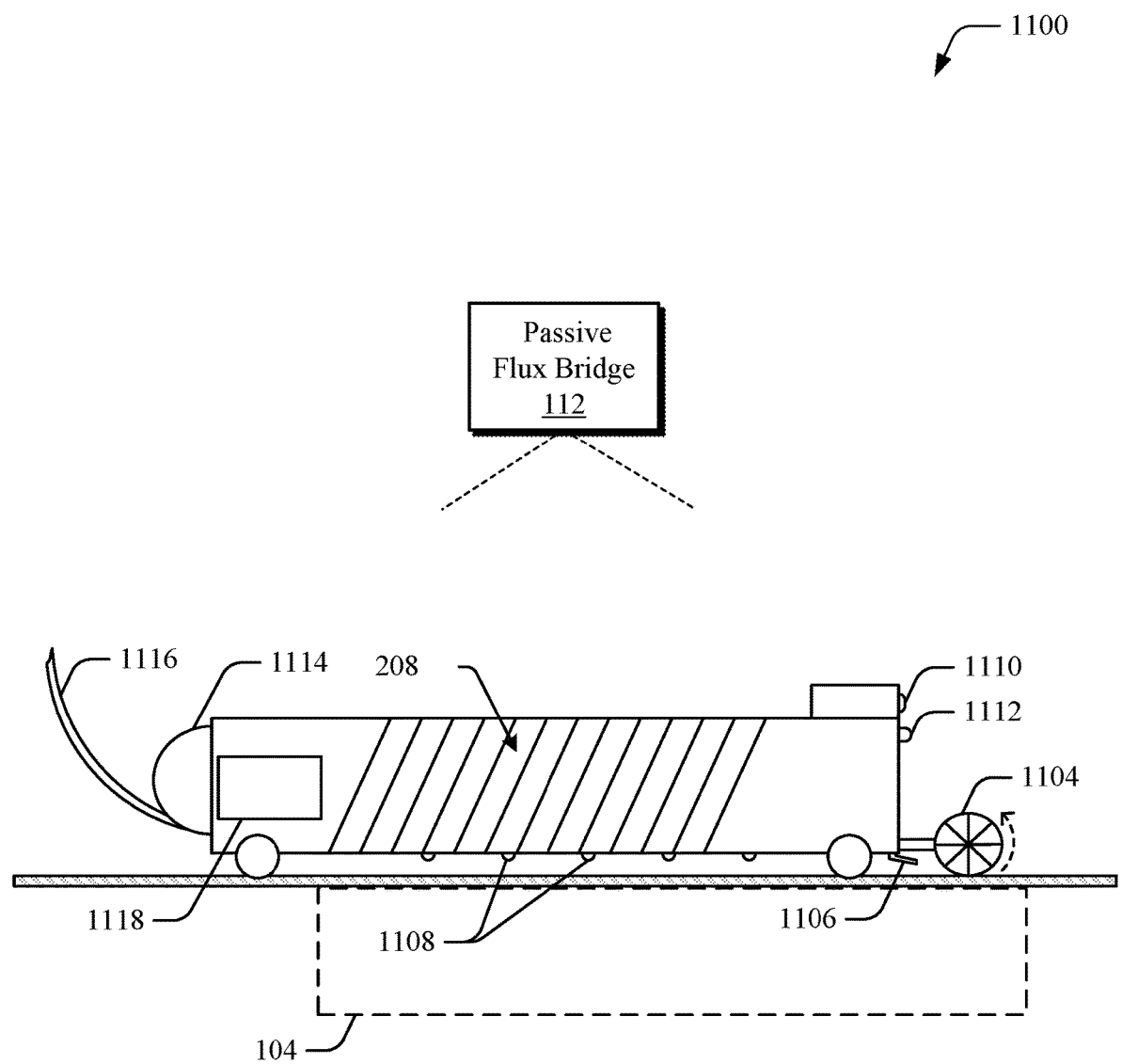
FIG. 11 illustrates an example implementation of a mobile apparatus with foreign object detection and living object protection systems.

FIG. 11 illustrates an example implementation 1100 of a mobile apparatus with foreign object detection and living object protection systems. These protection systems can be implemented in a mobile apparatus, such as the passive flux bridge 112 from FIG. 1.

In implementations, the flux bridge 112 can include one or more cleaning elements to clean an area around or on a base pad 104. The cleaning elements can include a variety of different cleaning elements, such as a powered brush 1104 or an air jet 1106. In addition, the flux bridge 112 can include one or more sensors, such as sensors 1108, configured to detect foreign metal objects positioned on or around the base pad 104. Additional sensors, such as sensor 1110, can be used to detect living objects on or around the flux bridge 112. If a living object (e.g., animal) is detected, the flux bridge 112 can use the air jet 1106 to blow air toward the living object to encourage the living object to depart. Alternatively, the flux bridge 112 can use turn on and/or flash one or more lights, such as optical fiber lights 1112, to encourage the living object to depart the area. The powered brush 1104 and/or the air jet 1106 can be used to clear the ground of detected foreign metal objects that may experience heating due to the magnetic field of the base pad 104.

Using cleaning elements, foreign metal objects that are susceptible to inductive heating can be removed automatically and without user intervention. Living objects can also be detected and removed. In some aspects, the mobile apparatus is configured to block access to the area once the area is cleaned. For example, after cleaning the area around and/or on the base pad 104, the flux bridge 112 can position itself to physically prevent additional debris or living objects from accessing or entering a high flux area proximate to the base pad 104, such as the area overlapping the base pad 104.

The flux bridge 112 is also illustrated as including a cable reel 1114 for storing a cable 1116 connected to a power source to provide electrical power to the flux bridge 112. Alternatively, the flux bridge 112 can include a battery 1118 to provide electrical power to the flux bridge 112. In at least one implementation, the battery 1118 can be charged by any suitable charging source, including the base pad 104. To do this, the flux bridge 112 can be constructed of non-metallic components and materials that do not increase in heat when exposed to magnetic fields. A portion of the magnetic field can be used to charge the battery 1118 of the flux bridge 112, while another portion of the magnetic field can be passively directed to the vehicle pad (not shown) using the ferrite 208 to charge the electric vehicle.

Figure 12:
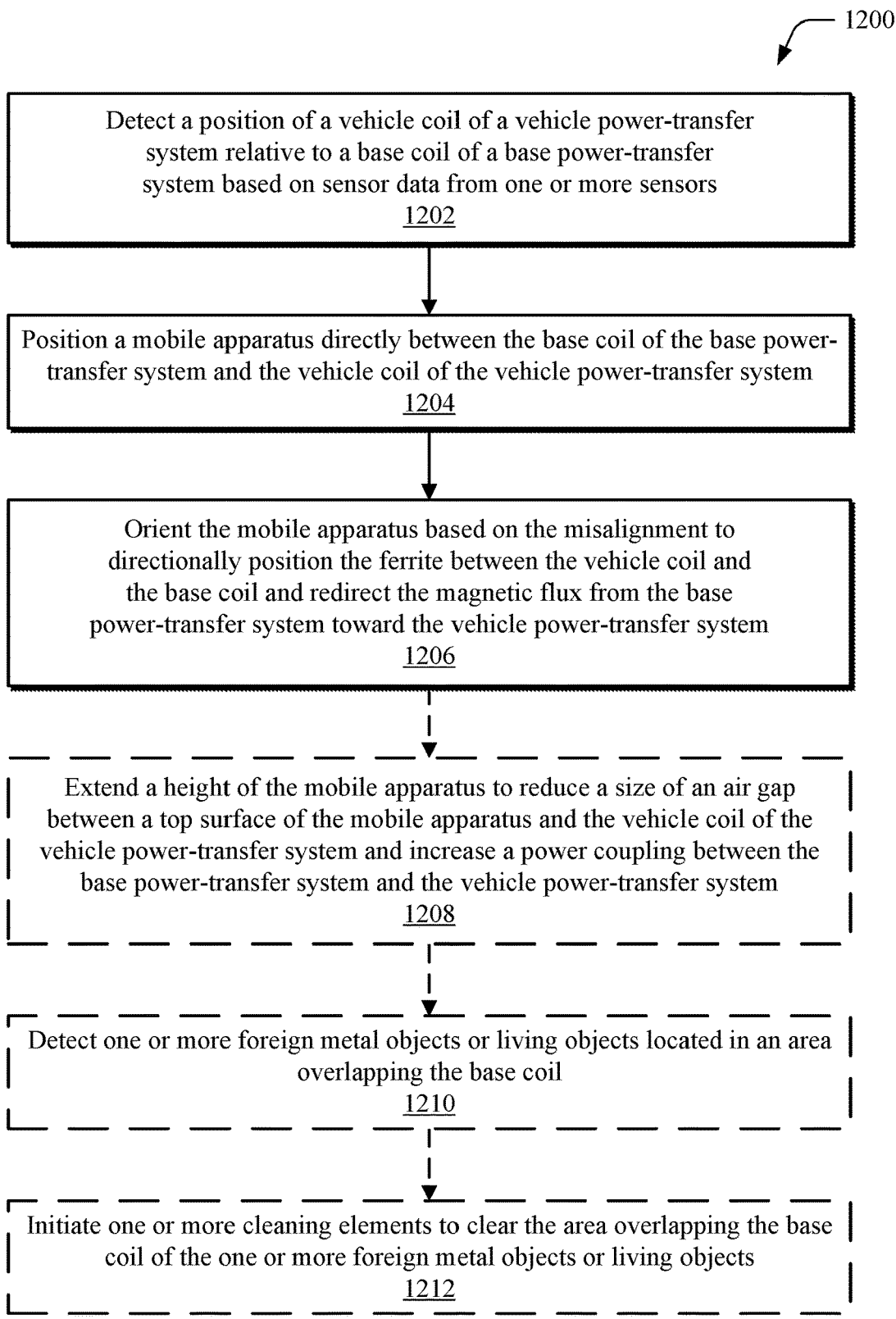
FIG. 12 depicts a flow diagram of an example process for increasing a power coupling between a vehicle power-transfer system and a base power-transfer system.

FIG. 12 depicts a flow diagram of an example process 1200 for increasing a power coupling between a vehicle power-transfer system and a base power-transfer system. At 1202, a position of a vehicle pad of a vehicle power-transfer system is determined relative to a base pad of a base power-transfer system based on sensor data from one or more sensors. The relative position of the vehicle pad can be detected using a variety of different techniques, examples of which include using radar sensors (e.g., ultrasonic sensors), proximity sensors, or image sensors.

At 1204, a mobile apparatus is positioned directly between the base coil of the base power-transfer system and the vehicle coil of the vehicle power-transfer system. The mobile apparatus can be positioned using one or more mobility components that enable movement of the mobile apparatus. In addition, the mobile apparatus can be positioned automatically using a controller that controls one or more motors that operate the mobility components, e.g., wheels, a continuous track system, a pulley system, or any other suitable mobility component.

At 1206, the mobile apparatus is oriented to directionally position the ferrite between the vehicle coil and the base coil and redirect magnetic flux from the base power-transfer system toward the vehicle power-transfer system. In aspects, the mobile apparatus includes ferrite that channels the magnetic flux. The flux travels along the length of the ferrite. Thus, by orienting the ferrite in a particular direction, the flux is steered or directed in that particular direction. Accordingly, by orienting the ferrite directly between the base coil and the vehicle coil, particularly when the vehicle coil is misaligned with the base coil, more of the flux is directed toward and reaches the intended destination, e.g., the vehicle pad, making charging of the vehicle more efficient. In one example, the ferrite has an elongated structure and is positioned to have a longitudinal axis of the ferrite directed between the base coil and the vehicle coil, which may allow magnetic flux to travel lengthwise along the ferrite directly to the vehicle coil from the base coil. In other examples, however, the ferrite includes other shapes, such as spherical, cubed, discoid, and so on. Accordingly, the ferrite can have any suitable shape to increase coupling between the vehicle coil and the base coil.

The process 1200 can then optionally proceed to 1208, where a height of the mobile apparatus is extended to reduce a size of an air gap between a top surface of the mobile apparatus and the vehicle coil of the vehicle power-transfer system and increase a power coupling between the base power-transfer system and the vehicle power-transfer system. For example, the mobile apparatus can include at least a top portion connected to a bottom portion such that the top portion can extend upward away from ground, increasing the height of the mobile apparatus. In addition, the ferrite in the mobile apparatus is arranged such that when the height of the mobile apparatus is adjusted, a height of the ferrite is also adjusted to extend the flux path along the ferrite. FIGS. 3 and 4 provides examples of adjustable ferrite within a height-adjustable mobile apparatus.

Optionally, at 1210, one or more foreign metal objects or living objects located in an area overlapping the base coil is detected. For example, foreign object detection (FOD) sensors can be used to detect foreign metal objects that may be susceptible to inductive heating caused by the magnetic field generated by the base pad. Alternatively, living object protection (LOP) sensors can be used to detect living objects such as animals on or near the base pad.

Another optional operation of the process 1200 includes 1212, where one or more cleaning elements are initiated to clear the area overlapping the base coil of the one or more foreign metal objects or living objects. In aspects, cleaning elements such as a brush or air jet can be used to clear the area over the base pad of debris and foreign metal objects. Also, cleaning elements such as lights, sounds, the air brush, or the air jet can be used to coax or encourage the living object to move away from the base pad.

Example Wireless Power Transfer System

The following discussion describes example wireless power transfer systems for charging an electric vehicle. The systems described below can include the above-described implementations described with respect to FIGS. 1-11 and can be used to employ the above-described methods described with respect to FIG. 12. An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 13:
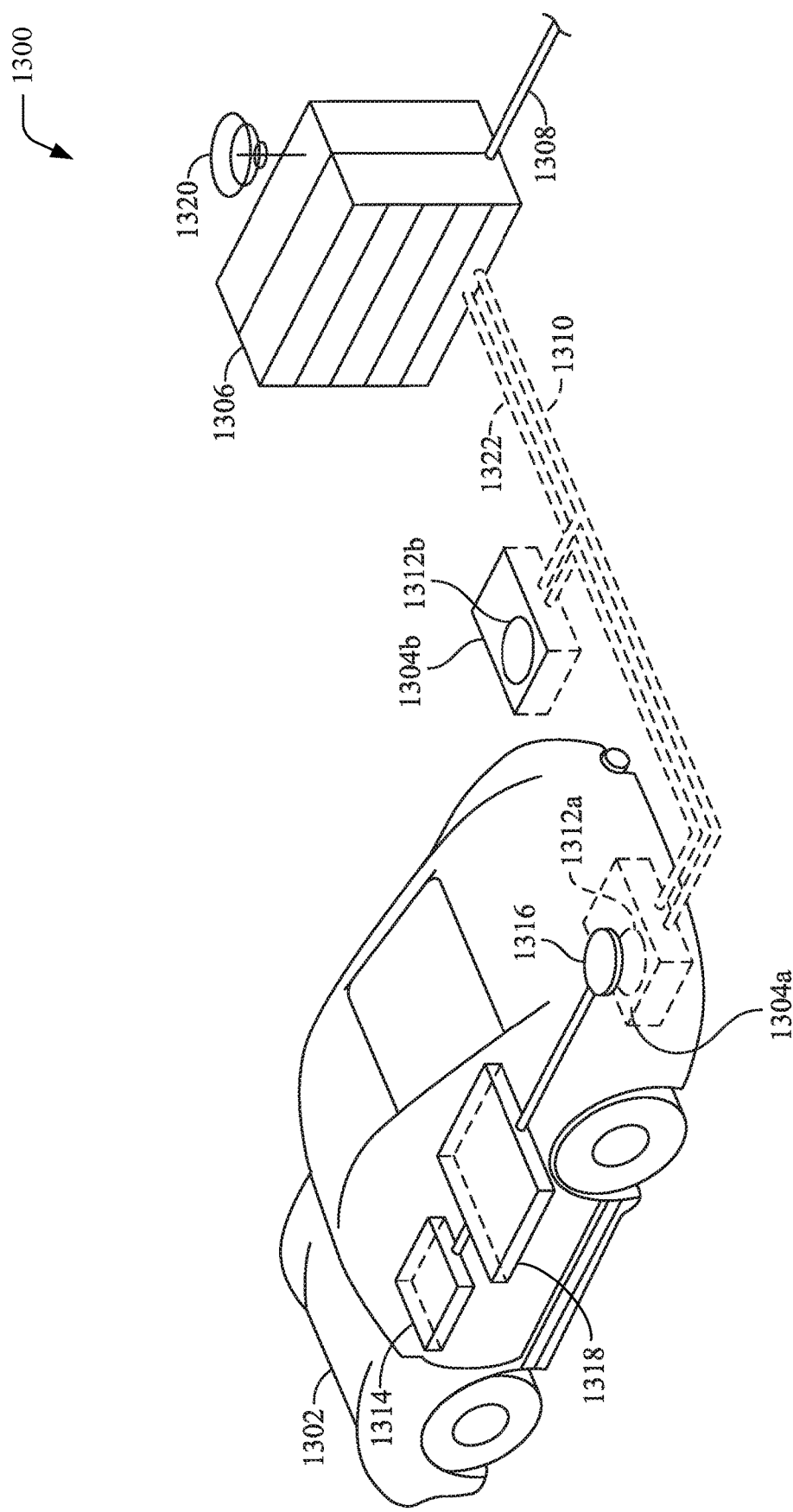
FIG. 13 is a diagram of an exemplary wireless power transfer system for charging an electric vehicle.

FIG. 13 is a diagram of an exemplary wireless power transfer system 1300 for charging an electric vehicle, in accordance with some exemplary implementations. The wireless power transfer system 1300 enables charging of an electric vehicle 1302 while the electric vehicle 1302 is stationary so as to efficiently couple with a base wireless charging system 1304a. Spaces for two electric vehicles are illustrated in a parking area to be parked over corresponding base wireless charging systems 1304a and 1304b. In some implementations, a local distribution center 1306 may be connected to a power backbone 1308 and configured to provide an alternating current (AC) or a direct current (DC) supply through a power link 1310 to the base wireless charging systems 1304a and 1304b. In aspects, each of the base wireless charging systems 1304a and 1304b also includes a base power-transfer structure 1312a and 1312b, respectively, for wirelessly transferring power. In some other implementations (not shown in FIG. 13), base power-transfer structures 1312a or 1312b may be stand-alone physical units and are not part of the base wireless charging system 1304a or 1304b. An example of base power-transfer structures 1312a or 1312b includes the base pad 104 as described with reference to FIG. 1.

The electric vehicle 1302 may include a battery unit 1314, an electric vehicle power-transfer structure 1316, and a wireless electric vehicle charging (WEVC) system 1318. The WEVC system 1318 and the electric vehicle power-transfer structure 1316 constitute the wireless charging system for the electric vehicle 1302. In some diagrams shown herein, the WEVC system 1318 is also referred to as a vehicle charging unit (VCU). The electric vehicle power-transfer structure 1316, such as the vehicle pad 106, may interact with the base power-transfer structure 1312a, for example via a region of the electromagnetic field generated by the base power-transfer structure 1312a.

In some exemplary implementations, the electric vehicle power-transfer structure 1316 may receive power when the electric vehicle power-transfer structure 1316 is located in an electromagnetic field produced by the base power-transfer structure 1312a. The field may correspond to a region where energy output by the base power-transfer structure 1312a may be captured by the electric vehicle power-transfer structure 1316. For example, the energy output by the base power-transfer structure 1312a may be at a level sufficient to charge or power the electric vehicle 1302. In some cases, the field may correspond to a "near-field" of the base power-transfer structure 1312a. The near-field may correspond to a region in which there are strong reactive fields resulting from the currents and charges in the base power-transfer structure 1312a that do not radiate power away from the base power-transfer structure 1312a. In at least one example, the near-field may correspond to a region that is within about $1/2\pi$ of a wavelength of a frequency of the electromagnetic field produced by the base power-transfer structure 1312a distant from the base power-transfer structure 1312a, as will be further described below.

The electric vehicle power-transfer structure 1316 may be aligned with the base power-transfer structure 1312a and, therefore, disposed within a near-field region simply by the electric vehicle operator positioning the electric vehicle 1302 such that the electric vehicle power-transfer structure 1316 is sufficiently aligned relative to the base power-transfer structure 1312a. Alignment may be considered sufficient when an alignment error has fallen below a tolerable value. The operator may, however, be given visual and/or auditory feedback to determine when the electric vehicle 1302 is properly placed within a tolerance area for wireless power transfer. The electric vehicle 1302 may be positioned by an autopilot system, which moves the electric vehicle 1302 until the sufficient alignment is achieved. This may be performed automatically and autonomously by the electric vehicle 1302 with or without driver intervention. This may be possible for an electric vehicle 1302 that is equipped with a servo steering, radar sensors (e.g., ultrasonic sensors), and intelligence for safely maneuvering and adjusting the electric vehicle. The electric vehicle 1302 and/or the base wireless charging system 1304a may have functionality for mechanically displacing and moving the power-transfer structures 1316 and 1312a, respectively, relative to each other to more accurately orient or align them and develop sufficient and/or otherwise more efficient coupling there between.

The base wireless charging system 1304a may be located in a variety of locations. As non-limiting examples, some suitable locations include a parking area at a home of the electric vehicle 1302 owner, parking areas reserved for electric vehicle wireless charging modeled after conventional petroleum-based filling stations, stoplights, and other locations, such as shopping centers and places of employment, when a vehicle may be stationary for some period of time. Local distribution center 1306 may be configured to communicate with external sources (e.g., a power grid) via a communication backhaul 1320, and with the base wireless charging system 1304a via a communication link 1322.

Charging electric vehicles wirelessly may provide numerous benefits. For example, charging may be performed automatically, virtually without driver intervention or manipulation thereby improving convenience to a user. There may also be no exposed electrical contacts and no mechanical wear out, thereby improving reliability of the wireless power transfer system 1300 as compared to a wired power transfer system. Safety may be improved since manipulations with cables and connectors may not be needed and there may be no cables, plugs, or sockets to be exposed to moisture in an outdoor environment. In addition, there may also be no visible or accessible sockets, cables, or plugs, thereby reducing potential vandalism of power charging devices. Further, since the electric vehicle 1302 may be used as distributed storage devices to stabilize a power grid, a convenient docking-to-grid solution may help to increase availability of vehicles for vehicle-to-grid (V2G) operation. The wireless power transfer system 1300 may also provide aesthetical and non-impedimental advantages. For example, there may be no charge columns or cables that may be impedimental for vehicles and/or pedestrians.

As a further explanation of the vehicle-to-grid capability, the wireless power transmit and receive capabilities may be configured to be reciprocal such that either the base wireless charging system 1304a can transmit power to the electric vehicle 1302 or the electric vehicle 1302 can transmit power to the base wireless charging system 1304a. This capability may be useful to stabilize the power distribution grid by allowing electric vehicles 1302 to contribute power to the overall distribution system in times of energy shortfall caused by over demand or shortfall in renewable energy production (e.g., wind or solar).

Figure 14:
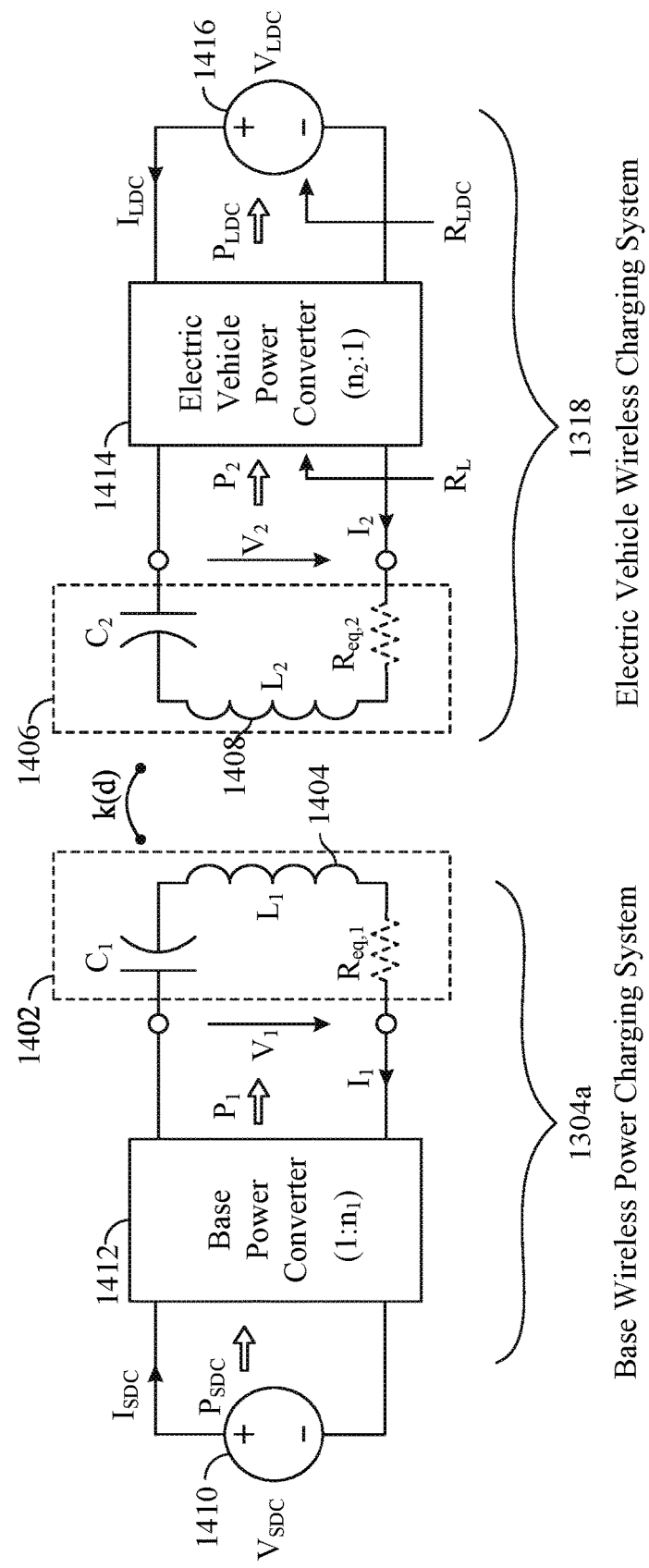
FIG. 14 is a schematic diagram of exemplary components of a wireless power transfer system of FIG. 13.

FIG. 14 is a schematic diagram of exemplary components of a wireless power transfer system 1400 similarly to that previously discussed in connection with FIG. 13, in accordance with some exemplary implementations. The wireless power transfer system 1400 may include a base resonant circuit 1402 including a base power-transfer structure 1404, such as the base pad 104, having an inductance $L_1$. The wireless power transfer system 1400 further includes an electric vehicle resonant circuit 1406 including an electric vehicle power-transfer structure 1408, such as the base pad 104, having an inductance $L_2$. In aspects, capacitively loaded conductor loops (e.g., multi-turn coils—e.g., potentially using Litz wire) are used that form a resonant structure capable of efficiently coupling energy from a primary structure (transmitter) to a secondary structure (receiver) via a magnetic or electromagnetic near-field if both the transmitter and the receiver are tuned to a common resonant frequency. The coils may be used for the electric vehicle power-transfer structure 1408 and the base power-transfer structure 1404. Using resonant structures for coupling energy may be referred to as "magnetically coupled resonance," "electromagnetically coupled resonance," and/or "resonant induction." The operation of the wireless power transfer system 1400 is described herein based on power transfer from the base power-transfer structure 1404 to the electric vehicle 1302 (not shown in FIG. 14), but is not limited thereto. For example, as discussed above, energy may also be transferred in the reverse direction.

With reference to FIG. 14, a power supply 1410 (e.g., AC or DC) supplies power $P_{SDC}$ to a base power converter 1412 as part of the base wireless charging system 1304a to transfer energy to an electric vehicle (e.g., electric vehicle 1302 of FIG. 13). The base power converter 1412 may include circuitry such as an AC-to-DC converter configured to convert power from standard mains AC to DC power at a suitable voltage level, and a DC-to-low frequency (LF) converter configured to convert DC power to power at an operating frequency suitable for wireless high-power transfer. The base power converter 1412 supplies power $P_1$ to the base resonant circuit 1402 including tuning capacitor $C_1$ in series with base power-transfer structure 1404 to emit an electromagnetic field at the operating frequency. In some aspects, the capacitor $C_1$ may be coupled with the base power-transfer structure 1404 in parallel. Tuning may, however, be formed of several reactive elements in any combination of parallel or series topology. The capacitor $C_1$ may be provided to form a resonant circuit with the base power-transfer structure 1404 that resonates substantially at the operating frequency. The base power-transfer structure 1404 receives the power $P_1$ and wirelessly transmits power at a level sufficient to charge or power the electric vehicle. For example, the level of power provided wirelessly by the base power-transfer structure 1404 may be on the order of kilowatts (kW) (e.g., anywhere from 1 kW to 80 kW, although actual levels may be or higher or lower).

The base resonant circuit 1402 (including the base power-transfer structure 1404 and tuning capacitor $C_1$) and the electric vehicle resonant circuit 1406 (including the electric vehicle power-transfer structure 1408 and tuning capacitor $C_2$) may be tuned to substantially the same frequency. The electric vehicle power-transfer structure 1408 may be positioned within the near-field of the base power-transfer structure 1404 and vice versa, as further explained below. In this case, the base power-transfer structure 1404 and the electric vehicle power-transfer structure 1408 may become coupled to one another such that power may be transferred wirelessly from the base power-transfer structure 1404 to the electric vehicle power-transfer structure 1408. The series capacitor $C_2$ may be provided to form a resonant circuit with the electric vehicle power-transfer structure 1408 that resonates substantially at the operating frequency. In some aspects, the capacitor $C_2$ may be coupled with the electric vehicle power-transfer structure 1408 in parallel. The electric vehicle resonant circuit 1406 may, however, be formed of several reactive elements in any combination of parallel or series topology. Element k(d) represents the mutual coupling coefficient resulting at coil separation d. Equivalent resistances $R_{eq,1}$ and $R_{eq,2}$ represent the losses that may be inherent to the base and electric vehicle power-transfer structures 1404 and 1408 and the tuning (anti-reactance) capacitors $C_1$ and $C_2$, respectively. The electric vehicle resonant circuit 1406, including the electric vehicle power-transfer structure 1408 and capacitor $C_2$, receives the power $P_2$ and provides the power $P_2$ to an electric vehicle power converter 1414 of the WEVC system 1318.

The electric vehicle power converter 1414 may include, among other things, a LF-to-DC converter configured to convert power at an operating frequency back to DC power at a voltage level of a load 1416 that may represent the electric vehicle battery unit. The electric vehicle power converter 1414 may provide the converted power $P_{LDC}$ to the load 1416. The power supply 1410, base power converter 1412, and base power-transfer structure 1404 may be stationary and located at a variety of locations as discussed above. The load 1416 (e.g., the electric vehicle battery unit), electric vehicle power converter 1414, and electric vehicle power-transfer structure 1408 may be included in the WEVC system 1318 that is part of the electric vehicle (e.g., electric vehicle 1302) or part of its battery pack (not shown). The WEVC system 1318 may also be configured to provide power wirelessly through the electric vehicle power-transfer structure 1408 to the base wireless charging system 1304a to feed power back to the grid or other power supply 1410. Each of the electric vehicle power-transfer structure 1408 and the base power-transfer structure 1404 may act as transmit or receive power-transfer structures based on the mode of operation.

Although not shown, the wireless power transfer system 1400 may include a load disconnect unit (LDU) to safely disconnect the electric vehicle load 1416 or the power supply 1410 from the wireless power transfer system 1400. For example, in case of an emergency or system failure, the LDU may be triggered to disconnect the load from the wireless power transfer system 1400. The LDU may be provided in addition to a battery management system for managing charging of a battery, or the LDU may be part of the battery management system.

Further, the WEVC system 1318 may include switching circuitry (not shown) for selectively connecting and disconnecting the electric vehicle power-transfer structure 1408 to the electric vehicle power converter 1414. Disconnecting the electric vehicle power-transfer structure 1408 may suspend charging and also may change the "load" as "seen" by the base wireless charging system 1304a (acting as a transmitter), which may be used to "cloak" the WEVC system 1318 (acting as the receiver) from the base wireless charging system 1304a. The load changes may be detected if the transmitter includes a load sensing circuit. Accordingly, the transmitter, such as the base wireless charging system 1304a, may have a mechanism for determining when receivers, such as the WEVC system 1318, are present in the near-field coupling mode region of the base power-transfer structure 1404 as further explained below.

As described above, during energy transfer towards an electric vehicle (e.g., electric vehicle 1302 of FIG. 13), input power is provided from the power supply 1410 such that the base power-transfer structure 1404 generates an electromagnetic field for providing the energy transfer. The electric vehicle power-transfer structure 1408 couples to the electromagnetic field and generates output power for storage or consumption by the electric vehicle 1302. In some aspects, the base resonant circuit 1402 and electric vehicle resonant circuit 1406 are configured and tuned according to a mutual resonant relationship such that they are resonating nearly or substantially at the operating frequency. Transmission losses between the base wireless charging system 1304a and WEVC system 1318 are minimal when the electric vehicle power-transfer structure 1408 is located in the near-field coupling mode region of the base power-transfer structure 1404 as further explained below.

As stated, an efficient energy transfer occurs by transferring energy via a magnetic near-field rather than via electromagnetic waves in the far-field, which may involve substantial losses due to radiation into the space. When in the near-field, a coupling mode may be established between the transmit power-transfer structure and the receive power-transfer structure. The space around the power-transfer structures where this near-field coupling may occur is referred to herein as a near-field coupling mode region.

While not shown, the base power converter 1412 and the electric vehicle power converter 1414 if bidirectional may both include, for a transmit mode, an oscillator, a driver circuit such as a power amplifier, a filter and matching circuit, and for a receive mode a rectifier circuit. The oscillator may be configured to generate a desired operating frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance as presented by the resonant circuits 1402 and 1406 to the base and electric vehicle power converters 1412 and 1414, respectively. For the receive mode, the base and electric vehicle power converters 1412 and 1414 may also include a rectifier and switching circuitry.

The electric vehicle power-transfer structure 1408 and the base power-transfer structure 1404 as described throughout the disclosed implementations may be referred to or configured as "conductor loops," and more specifically, as "multi-turn conductor loops" or coils (e.g., potentially implemented as Litz wire wound to have multiple turns). The base and electric vehicle power-transfer structures 1404 and 1408 may also be referred to herein or be configured as "magnetic" power-transfer structures. The term "power-transfer structure" (also referred to herein as a "power-transfer system" or a "pad") is intended to refer to a component that may wirelessly output or receive energy for coupling to another "power-transfer structure."

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency.

A resonant frequency may be based on the inductance and capacitance of a resonant circuit (e.g. resonant circuit 1402) including a power-transfer structure (e.g., the base power-transfer structure 1404 and capacitor $C_1$) as described above. As shown in FIG. 14, inductance may generally be the inductance of the power-transfer structure, whereas, capacitance may be added to the power-transfer structure to create a resonant structure at a desired resonant frequency. Accordingly, for larger size power-transfer structures using larger diameter coils exhibiting larger inductance, the value of capacitance needed to produce resonance may be lower. Inductance may also depend on a number of turns of a coil. Furthermore, as the size of the power-transfer structure increases, coupling efficiency may increase. This is mainly true if the size of both base and electric vehicle power-transfer structures increase. Furthermore, a resonant circuit including a power-transfer structure and tuning capacitor may be designed to have a high quality (Q) factor to improve energy transfer efficiency. For example, the Q factor may be 300 or greater.

As described above, the near-field may correspond to a region around the power-transfer structure in which mainly reactive electromagnetic fields exist. If the physical size of the power-transfer structure is much smaller than the wavelength, inversely proportional to the frequency, there is no substantial loss of power due to waves propagating or radiating away from the power-transfer structure. Near-field coupling-mode regions may correspond to a volume that is near the physical volume of the power-transfer structure, typically within a small fraction of the wavelength. According to some aspects, power-transfer structures, such as single and multi-turn conductor loops, are preferably used for both transmitting and receiving since handling magnetic fields in practice is easier than electric fields because there is less interaction with foreign objects, e.g., dielectric objects and the human body. Nevertheless, "electric" power-transfer structures (e.g., dipoles and monopoles) or a combination of magnetic and electric power-transfer structures may be used.

Figure 15:
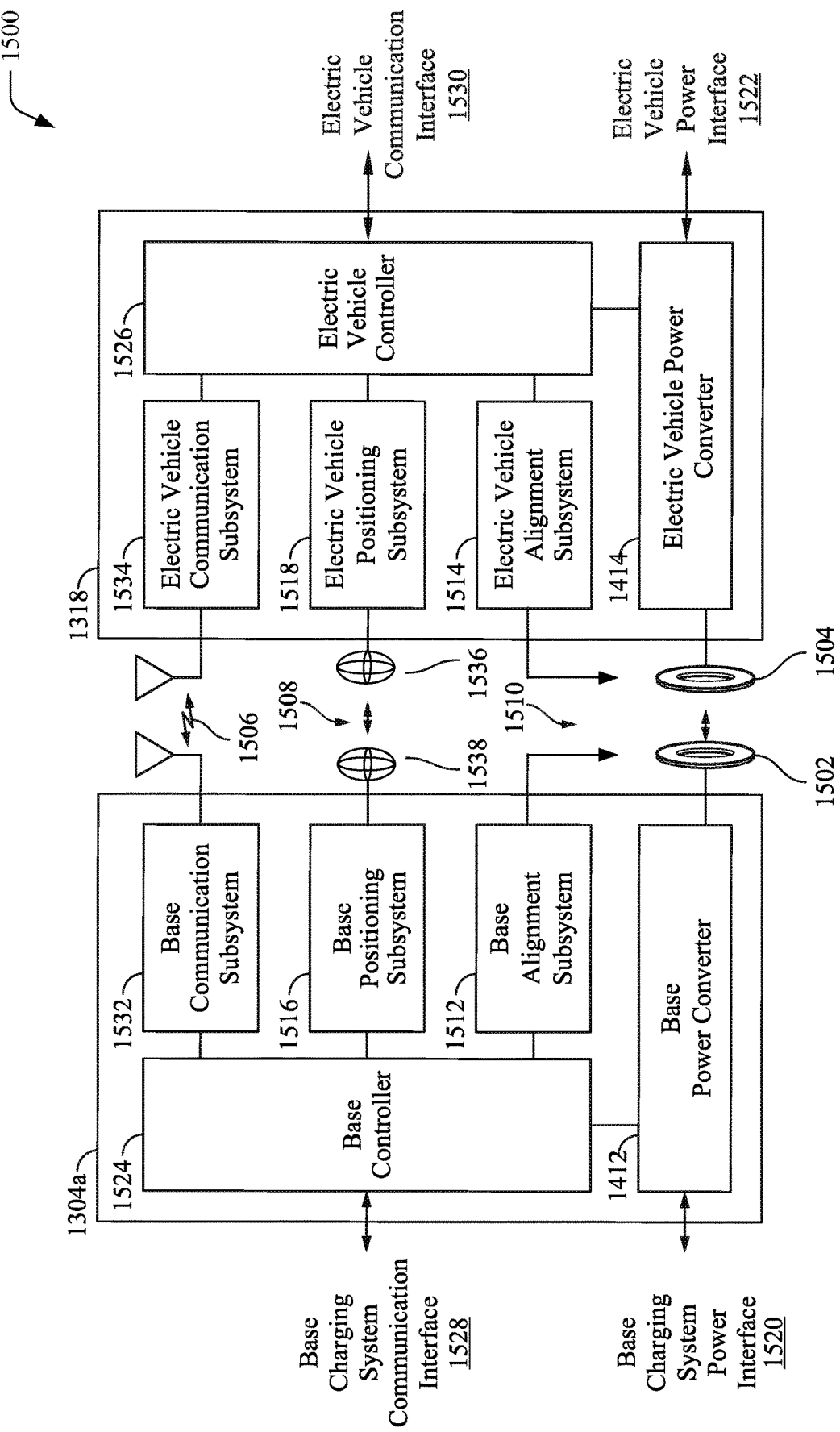
FIG. 15 is a functional block diagram showing exemplary components of wireless power transfer system of FIG. 13.

FIG. 15 is a functional block diagram showing exemplary components of wireless power transfer system 1500, which may be employed in the wireless power transfer system 1300 of FIG. 13 and/or may be included as part of the wireless power transfer system 1400 of FIG. 14. The wireless power transfer system 1500 illustrates a base power-transfer structure 1502 and an electric vehicle power-transfer structure 1504. In addition, the wireless power transfer system 1500 includes a communication link 1506; a positioning link 1508, using, for example, a magnetic field signal for determining a position or direction; and an alignment mechanism 1510 capable of mechanically moving one or both of the base power-transfer structure 1502 and the electric vehicle power-transfer structure 1504. An example of the base power-transfer structure 1502 and/or the electric vehicle power-transfer structure 1504 is the vehicle pad 106 described above with reference to FIG. 1. Mechanical (kinematic) alignment of the base power-transfer structure 1502 and the electric vehicle power-transfer structure 1504 may be controlled by a base alignment subsystem 1512 and an electric vehicle alignment subsystem 1514, respectively. The positioning link 1508 may be capable of bi-directional signaling, meaning that positioning signals may be emitted by a base positioning subsystem 1516 or an electric vehicle positioning subsystem 1518, or by both.

As described above with reference to FIG. 13, when energy flows towards the electric vehicle 1302, in FIG. 15 a base charging system power interface 1520 may be configured to provide power to a base power converter 1412 from a power source, such as an AC or DC power supply (not shown). The base power converter 1412 may receive AC or DC power via the base charging system power interface 1520 to drive the base power-transfer structure 1502 at a frequency near or at the resonant frequency of the base resonant circuit 1402 with reference to FIG. 14. The electric vehicle power-transfer structure 1504, when in the near-field coupling-mode region, may receive energy from the electromagnetic field to oscillate at or near the resonant frequency of the electric vehicle resonant circuit 1406 with reference to FIG. 14. The electric vehicle power converter 1414 converts the oscillating signal from the electric vehicle power-transfer structure 1504 to a power signal suitable for charging a battery via an electric vehicle power interface 1522.

The base wireless charging system 1304a includes a base controller 1524, and the WEVC system 1318 includes an electric vehicle controller 1526. The base controller 1524 may provide a base charging system communication interface 1528 to other systems (not shown) such as, for example, a computer, a base common communication (BCC), a communications entity of the power distribution center, or a communications entity of a smart power grid. The electric vehicle controller 1526 may provide an electric vehicle communication interface 1530 to other systems (not shown) such as, for example, an onboard computer on the vehicle, a battery management system, other systems within the vehicle, and remote systems.

The wireless power transfer system 1500 is illustrated as including a base communication subsystem 1532 and an electric vehicle communication subsystem 1534 that may include subsystems or modules for specific application with separate communication channels and also for wirelessly communicating with other communications entities not shown in the diagram of FIG. 15. These communications channels may be separate physical channels or separate logical channels. As non-limiting examples, the base alignment subsystem 1512 may communicate with the electric vehicle alignment subsystem 1514 through the communication link 1506 to provide a feedback mechanism for more closely aligning the base power-transfer structure 1502 and the electric vehicle power-transfer structure 1504, for example via autonomous mechanical (kinematic) alignment, by either the electric vehicle alignment subsystem 1514 or the base alignment subsystem 1512, or by both, or with operator assistance as described herein.

The WEVC system 1318 may further include the electric vehicle positioning subsystem 1518 connected to a magnetic field generator 1536. The electric vehicle positioning subsystem 1518 may be configured to drive the magnetic field generator 1536 with currents that generate an alternating magnetic field. The base wireless charging system 1304a may include a magnetic field sensor 1538 connected to a base positioning subsystem 1516. The magnetic field sensor 1538 may be configured to generate a plurality of voltage signals under influence of the alternating magnetic field generated by the magnetic field generator 1536. The base positioning subsystem 1516 may be configured to receive these voltage signals and output a signal indicative of a position estimate and an angle estimate between the magnetic field sensor 1538 and the magnetic field generator 1536. These position and angle estimates may be translated into visual and/or acoustic guidance and alignment information that a driver of the electric vehicle may use to reliably park the vehicle. In some implementations, these position and angle estimates may be used to park a vehicle automatically with no or only minimal driver intervention (drive by wire).

In some implementations, the positioning error (error in the position estimates) at offsets (distances) <20 cm may be specified to <2 cm, and for distances >20 cm to <1% of distance, e.g., <10 cm at a distance of 1 m and <50 cm at a distance of 5 m, where the distance refers to the horizontal distance between the magnetic centers of the magnetic field generator 1536 and the magnetic field sensor 1538. The positioning error may refer to the error magnitude (error radius) and, e.g., to the $100^{th}$ percentile of position error statistics. Accordingly, the orientation error (error in the angle estimate) at distances <20 cm may be specified to <2°, and for distances >20 cm to <5°.

Further, the electric vehicle controller 1526 may be configured to communicate with electric vehicle onboard systems. For example, the electric vehicle controller 1526 may provide, via the electric vehicle communication interface 1530, position data, e.g., for a brake system configured to perform a semi-automatic parking operation, or for a steering servo system configured to assist with a largely automated parking ("park by wire") that may provide more convenience and/or higher parking accuracy as may be needed in certain applications to provide sufficient alignment between base and electric vehicle power-transfer structures 1502 and 1504. Moreover, electric vehicle controller

1526 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

The wireless power transfer system 1500 may also support plug-in charging via a wired connection, for example, by providing a wired charge port (not shown) at the WEVC system 1318. The WEVC system 1318 may integrate the outputs of the two different chargers prior to transferring power to or from the electric vehicle. Switching circuits may provide the functionality as needed to support both wireless charging and charging via a wired charge port.

To communicate between the base wireless charging system 1304a and the WEVC system 1318, the wireless power transfer system 1500 may use in-band signaling via base and electric vehicle power-transfer structures 1502, 1504 and/or out-of-band signaling via communications systems (subsystems 1532, 1534), e.g., via an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

Some communications (e.g., in-band signaling) may be performed via the wireless power link without using specific communications antennas. For example, the base and electric vehicle power-transfer structures 1502 and 1504 may also be configured to act as wireless communication antennas. Thus, some implementations of the base wireless charging system 1304a may include a controller (not shown) for enabling keying type protocol on the wireless power path. By keying the transmit power level (amplitude shift keying) at predefined intervals with a predefined protocol, the receiver may detect a serial communication from the transmitter. The base power converter 1412 may include a load sensing circuit (not shown) for detecting the presence or absence of active electric vehicle power receivers in the near-field coupling mode region of the base power-transfer structure 1502. By way of example, a load sensing circuit monitors the current flowing to a power amplifier of the base power converter 1412, which is affected by the presence or absence of active power receivers in the near-field coupling mode region of the base power-transfer structure 1502. Detection of changes to the loading on the power amplifier may be monitored by the base controller 1524 for use in determining whether to enable the base wireless charging system 1304a for transmitting energy, to communicate with a receiver, or a combination thereof.

Although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. A mobile apparatus for wireless power transfer, the mobile apparatus comprising: one or more mobility components configured to enable movement of the apparatus and positioning of the apparatus proximate to a vehicle power-transfer system of an electric vehicle; and ferrite configured to passively channel magnetic flux between a base power-transfer system and the vehicle power-transfer system to wirelessly charge a battery of the electric vehicle, and the mobile apparatus being separate from both the electric vehicle and the base power-transfer system.

2. The mobile apparatus as described in claim 1, wherein the ferrite is configured to redirect magnetic flux from a base coil of the base power-transfer system when a vehicle coil of the vehicle power-transfer system is misaligned with the base coil.

3. The mobile apparatus as described in claim 1, further comprising one or more sensors configured to detect a position of the apparatus relative to the base power-transfer system.

4. The mobile apparatus as described in claim 3, wherein the one or more sensors are further configured to detect a location of at least one of the base power-transfer system or the vehicle power-transfer system.

5. The mobile apparatus as described in claim 3, wherein the one or more sensors are configured to detect foreign metal objects or living objects located in an area overlapping the base power-transfer system.

6. The mobile apparatus as described in claim 1, further comprising a controller configured to automatically:
   detect misalignment between a base coil of the base power-transfer system and a vehicle coil the vehicle power-transfer system; and
   cause a motor to operate the one or more mobility components to orient the apparatus to a position that increases a power coupling between the base power-transfer system and the vehicle power-transfer system by steering magnetic flux from the base coil toward the vehicle coil.

7. The mobile apparatus as described in claim 1, further comprising at least one power-transfer repeater system configured to extend power transfer from the base power-transfer system to the vehicle power-transfer system.

8. The mobile apparatus of claim 1, wherein the ferrite is oriented at an acute angle or an obtuse angle from ground.

9. The mobile apparatus of claim 1, wherein the ferrite is positioned to alter an original direction of a magnetic field generated by the base power-transfer system.

10. The mobile apparatus of claim 1, wherein the ferrite is positioned to have a longitudinal axis of the ferrite directed between a base coil of the base power-transfer system and a vehicle coil of the vehicle power-transfer system.

11. The mobile apparatus of claim 1, wherein the apparatus is formed from non-metallic materials.

12. The mobile apparatus of claim 1, further comprising a controller configured to schedule an amount of time to charge the electric vehicle based on one or more of a state of charge of the electric vehicle, an estimated distance that the electric vehicle is to be driven, a priority status of the electric vehicle, or a number of passengers scheduled to ride in the electric vehicle.

13. The mobile apparatus of claim 1, further comprising one or more cleaning elements configured to clear an area overlapping the base power-transfer system of foreign objects.

14. The mobile apparatus of claim 13, wherein the one or more cleaning elements include at least one of a brush or an air jet.

15. The mobile apparatus of claim 1, wherein the apparatus is configured to prevent foreign objects from entering an area overlapping the base power-transfer system.

16. The mobile apparatus of claim 1, wherein the ferrite is extendable in at least one dimension.

17. A method for increasing a power coupling between a vehicle power-transfer system of an electric vehicle and a base power-transfer system, the method comprising: positioning a mobile apparatus, which is separate from both the vehicle power-transfer system and the base power transfer system, directly between a base coil of the base power-transfer system and a vehicle coil of the vehicle power-transfer system, the mobile apparatus including ferrite configured to passively channel magnetic flux between the base power-transfer system and the vehicle power-transfer system to wirelessly charge a battery of the electric vehicle; and orienting the ferrite to directionally position the ferrite between the vehicle coil and the base coil and steer the magnetic flux from the base power-transfer system toward the vehicle power-transfer system.

18. The method as described in claim 17, further comprising:
detecting misalignment between the vehicle coil and the base coil based on sensor data from one or more sensors; and
orienting the ferrite based on the misalignment.

19. The method as described in claim 17, wherein the ferrite is positioned non-orthogonally to the base coil or the vehicle coil.

20. The method as described in claim 17, further comprising extending a height of the mobile apparatus to reduce a size of an air gap between the base power-transfer system and the vehicle power-transfer system and increase a power coupling between the base power-transfer system and the vehicle power-transfer system, the ferrite including a first set of ferrite pieces and a second set of ferrite pieces that interlock with the first set of ferrite pieces, and extending the height of the mobile apparatus includes decreasing an amount of overlap between interlocking or overlapping ferrite pieces to extend an effective length of the ferrite.

21. The method as described in claim 17, further comprising:
detecting one or more foreign metal objects or living objects located in an area overlapping the base coil; and
initiating one or more cleaning elements to clear the area overlapping the base coil of the one or more foreign metal objects or living objects.

22. The method as described in claim 17, further comprising:
detecting a location of the base coil and a relative location of the vehicle coil based on sensor data from one or more sensors of the mobile apparatus; and
controlling a motor that operates one or more mobility components of the mobile apparatus to position the mobile apparatus between the base coil and the vehicle coil.

23. A mobile base power-transfer apparatus comprising:
ferrite configured to channel magnetic flux induced by a magnetic field; and
a first coil configured to generate the magnetic field based on an electric current running through the first coil, the first coil configured to be removably positioned proximate to a second coil of another base power-transfer apparatus to provide a combined magnetic field that is greater than the magnetic field generated by the first coil, the electric current running through the first coil being synchronized with a current running through the second coil, the electric current running through the first coil in a first direction that is opposite a second direction of the current running through the second coil.

24. The mobile base power-transfer apparatus as described in claim 23, further comprising:
one or more mobility components configured to enable movement and positioning of the mobile base power-transfer apparatus proximate to or away from the other base power-transfer apparatus; and
one or more motors configured to operate the one or more mobility components.

25. The mobile base power-transfer apparatus as described in claim 23, wherein the first coil is configured to charge an electric vehicle at a predefined level of charging based on the magnetic field, and wherein the combined magnetic field is usable to charge the electric vehicle at a second level of charging that is greater than the predefined level of charging.

* * * * *